United States Patent
Pera et al.

(10) Patent No.: US 9,680,704 B2
(45) Date of Patent: Jun. 13, 2017

(54) COMPACT AND INTEGRATED KEY CONTROLLER APPARATUS FOR MONITORING NETWORKS

(71) Applicant: Ubiquiti Networks, Inc., San Jose, CA (US)

(72) Inventors: Robert J. Pera, San Jose, CA (US); Ramanujam Jagannath, Cupertino, CA (US); Sriram Dayanandan, Dublin, CA (US); Takaaki Kojima, Lake Oswego, OR (US); Eugen-Andrei Gavriloaie, Bragadiru (RO)

(73) Assignee: Ubiquiti Networks, Inc., San Jose, CA (US)

( * ) Notice: Subject to any disclaimer, the term of this patent is extended or adjusted under 35 U.S.C. 154(b) by 0 days.

(21) Appl. No.: 15/276,527

(22) Filed: Sep. 26, 2016

(65) Prior Publication Data
US 2017/0093625 A1      Mar. 30, 2017

Related U.S. Application Data

(60) Provisional application No. 62/233,279, filed on Sep. 25, 2015.

(51) Int. Cl.
*G06F 15/16* (2006.01)
*H04L 12/24* (2006.01)
(Continued)

(52) U.S. Cl.
CPC .......... *H04L 41/0813* (2013.01); *H04L 43/08* (2013.01); *H04L 63/02* (2013.01);
(Continued)

(58) Field of Classification Search
CPC ..... H04L 12/24; H04L 41/00; H04L 41/0816; H04L 41/04; H04L 41/28; H04W 84/12; H04W 88/08; H04W 88/085; H04W 88/12
(Continued)

(56) References Cited

U.S. PATENT DOCUMENTS

| | | | |
|---|---|---|---|
| 5,131,006 A | 7/1992 | Kamerman et al. | |
| 5,151,920 A | 9/1992 | Haagh et al. | |

(Continued)

FOREIGN PATENT DOCUMENTS

| JP | 2007074193 A | 3/2007 |
|---|---|---|
| KR | 10-2013-0141939 | 12/2013 |

(Continued)

OTHER PUBLICATIONS

ETSI; Reconfigurable radio systems(RRS) functional architecture (FA) for the management and control of reconfigurable radio systems; ETSI TR 102 682 V1.1.1; 45 pages; retrieved from the internet (http://portal.etsi.org/webapp/WorkProgram/Report_WorkItem.asp?WKI_ID=28797); © Jul. 17, 2009.

*Primary Examiner* — David Lazaro
(74) *Attorney, Agent, or Firm* — Shay Glenn LLP

(57) ABSTRACT

Compact and integrated local key controller apparatuses for remotely managing a network of wireless devices that are connected to a computer network switch. These apparatuses (including devices and systems) and methods of using them may provide secure and fully integrated, stand-alone wireless network controllers that may be accessed remotely without compromising the integrity of the network's firewall.

25 Claims, 18 Drawing Sheets

(51) Int. Cl.
*H04L 12/26* (2006.01)
*H04L 29/06* (2006.01)
*H04W 84/12* (2009.01)
*H04L 12/46* (2006.01)

(52) U.S. Cl.
CPC .......... *H04L 63/06* (2013.01); *H04L 63/0815* (2013.01); *H04L 12/4641* (2013.01); *H04W 84/12* (2013.01)

(58) Field of Classification Search
USPC .................................. 709/220, 221, 224, 219
See application file for complete search history.

(56) References Cited

U.S. PATENT DOCUMENTS

| | | | |
|---|---|---|---|
| 5,295,154 | A | 3/1994 | Meier et al. |
| 5,406,260 | A | 4/1995 | Cummings et al. |
| 5,422,887 | A | 6/1995 | Diepstraten et al. |
| 5,428,636 | A | 6/1995 | Meier |
| 5,504,746 | A | 4/1996 | Meier |
| 5,546,397 | A | 8/1996 | Mahany |
| 5,706,428 | A | 1/1998 | Boer et al. |
| 5,740,366 | A | 4/1998 | Mahany et al. |
| 5,844,893 | A | 12/1998 | Gollnick et al. |
| 5,936,542 | A | 8/1999 | Kleinrock et al. |
| 5,940,771 | A | 8/1999 | Gollnick et al. |
| 6,130,892 | A | 10/2000 | Short et al. |
| 6,194,992 | B1 | 2/2001 | Short et al. |
| 6,337,990 | B1 | 1/2002 | Koshino |
| 6,374,311 | B1 | 4/2002 | Mahany et al. |
| 6,563,786 | B1 | 5/2003 | Nee |
| 6,636,894 | B1 | 10/2003 | Short et al. |
| 6,665,536 | B1 | 12/2003 | Mahany |
| 6,697,415 | B1 | 2/2004 | Mahany |
| 6,714,559 | B1 | 3/2004 | Meier |
| 6,789,110 | B1 | 9/2004 | Short et al. |
| 6,795,852 | B1 | 9/2004 | Kleinrock et al. |
| 6,810,426 | B2 | 10/2004 | Mysore et al. |
| 6,857,009 | B1 | 2/2005 | Ferreria et al. |
| 6,868,399 | B1 | 3/2005 | Short et al. |
| 7,020,082 | B2 | 3/2006 | Bhagavath et al. |
| 7,088,727 | B1 | 8/2006 | Short et al. |
| 7,117,526 | B1 | 10/2006 | Short |
| 7,194,554 | B1 | 3/2007 | Short et al. |
| 7,197,556 | B1 | 3/2007 | Short et al. |
| 7,254,191 | B2 | 8/2007 | Sugar et al. |
| 7,295,812 | B2 | 11/2007 | Haapoja et al. |
| 7,386,002 | B2 | 6/2008 | Meier |
| 7,457,646 | B2 | 11/2008 | Mahany et al. |
| 7,739,383 | B1 | 6/2010 | Short et al. |
| 7,752,334 | B2 | 7/2010 | Paunikar et al. |
| 7,826,426 | B1 | 11/2010 | Bharghavan et al. |
| 8,077,113 | B2 | 12/2011 | Syed et al. |
| 8,190,708 | B1 | 5/2012 | Short et al. |
| 8,335,272 | B2 | 12/2012 | Roberts |
| 8,483,188 | B2 | 7/2013 | Walton et al. |
| 8,804,732 | B1* | 8/2014 | Hepting .............. H04W 76/021 370/392 |
| 8,836,601 | B2 | 9/2014 | Sanford et al. |
| 9,078,137 | B1* | 7/2015 | Chechani .............. H04W 12/08 |
| 9,172,605 | B2 | 10/2015 | Hardy et al. |
| 9,516,700 | B1* | 12/2016 | Rybak .................. H04W 92/12 |
| 2003/0198200 | A1 | 10/2003 | Diener et al. |
| 2004/0143428 | A1 | 7/2004 | Rappaport et al. |
| 2004/0242274 | A1 | 12/2004 | Corbett et al. |
| 2007/0070691 | A1 | 3/2007 | Walvis et al. |
| 2007/0099660 | A1 | 5/2007 | Bhesania et al. |
| 2007/0201540 | A1* | 8/2007 | Berkman ............... H04B 3/542 375/219 |
| 2008/0049625 | A1 | 2/2008 | Edwards et al. |
| 2009/0175181 | A1 | 7/2009 | Kim et al. |
| 2009/0196173 | A1 | 8/2009 | Wang et al. |
| 2009/0286484 | A1* | 11/2009 | Phung ................... H04L 12/24 455/67.11 |
| 2010/0008237 | A1 | 1/2010 | Olgaard et al. |
| 2010/0124886 | A1 | 5/2010 | Fordham et al. |
| 2010/0182983 | A1* | 7/2010 | Herscovici ........... H04L 63/102 370/338 |
| 2010/0182984 | A1* | 7/2010 | Herscovici .......... H04L 63/0892 370/338 |
| 2011/0090812 | A1 | 4/2011 | Aoyama |
| 2011/0164700 | A1 | 7/2011 | Porat et al. |
| 2011/0185059 | A1 | 7/2011 | Adnani et al. |
| 2011/0211628 | A1 | 9/2011 | Hammarwall et al. |
| 2011/0258678 | A1 | 10/2011 | Cowling et al. |
| 2012/0096271 | A1 | 4/2012 | Ramarathinam et al. |
| 2012/0109719 | A1 | 5/2012 | Parmar et al. |
| 2012/0122424 | A1* | 5/2012 | Herscovici .......... H04L 63/0428 455/411 |
| 2012/0188892 | A1 | 7/2012 | Demilie et al. |
| 2012/0281000 | A1 | 11/2012 | Woodings |
| 2012/0317224 | A1* | 12/2012 | Caldwell .............. H04L 45/745 709/217 |
| 2013/0017794 | A1 | 1/2013 | Kloper et al. |
| 2013/0051441 | A1 | 2/2013 | Cho et al. |
| 2013/0067564 | A1 | 3/2013 | Fok Ah Chuen et al. |
| 2013/0103836 | A1* | 4/2013 | Baniqued ............ H04L 41/0803 709/226 |
| 2013/0129091 | A1 | 5/2013 | Kang et al. |
| 2013/0163653 | A1 | 6/2013 | Hirschmann et al. |
| 2013/0201316 | A1 | 8/2013 | Binder et al. |
| 2013/0333005 | A1 | 12/2013 | Kim et al. |
| 2014/0004865 | A1 | 1/2014 | Bhargava et al. |
| 2014/0005809 | A1 | 1/2014 | Frei et al. |
| 2014/0036805 | A1 | 2/2014 | Sadek et al. |
| 2014/0041012 | A1* | 2/2014 | Yeow .................... H04L 63/02 726/11 |
| 2014/0092884 | A1* | 4/2014 | Murphy ................. H04L 41/00 370/338 |
| 2014/0115354 | A1 | 4/2014 | Jabbaz et al. |
| 2014/0122298 | A1 | 5/2014 | Oyer |
| 2014/0126403 | A1 | 5/2014 | Siomina |
| 2014/0146764 | A1 | 5/2014 | Kim et al. |
| 2014/0211890 | A1 | 7/2014 | Adnani et al. |
| 2014/0269375 | A1 | 9/2014 | Garcia et al. |
| 2014/0331298 | A1* | 11/2014 | Baker .................. H04L 63/0272 726/7 |
| 2015/0009901 | A1* | 1/2015 | Gorajala Chandra ............ H04L 41/0803 370/329 |
| 2015/0156645 | A1 | 6/2015 | Ponnuswamy et al. |
| 2015/0163753 | A1 | 6/2015 | Valliappan et al. |
| 2015/0245360 | A1 | 8/2015 | Gao et al. |
| 2016/0014613 | A1 | 1/2016 | Ponnampalam et al. |
| 2016/0066200 | A1 | 3/2016 | Dayanandan et al. |
| 2016/0066202 | A1 | 3/2016 | Dayanandan et al. |
| 2016/0100320 | A1 | 4/2016 | Dayanandan et al. |
| 2016/0112257 | A1 | 4/2016 | Hardy et al. |
| 2016/0143028 | A1* | 5/2016 | Mancuso ............... H04W 12/00 370/338 |
| 2016/0226623 | A1 | 8/2016 | Fr berg Olsson et al. |
| 2016/0315781 | A1* | 10/2016 | Dronadula ........... H04L 12/189 |
| 2016/0323810 | A1* | 11/2016 | May ..................... H04W 76/02 |

FOREIGN PATENT DOCUMENTS

| | | |
|---|---|---|
| WO | WO98/40990 A1 | 9/1998 |
| WO | WO01/31855 A2 | 5/2001 |
| WO | WO01/31886 A2 | 5/2001 |
| WO | WO01/86877 A2 | 11/2001 |
| WO | WO2008/042804 A2 | 4/2008 |
| WO | WO2011/005710 A2 | 1/2011 |

* cited by examiner

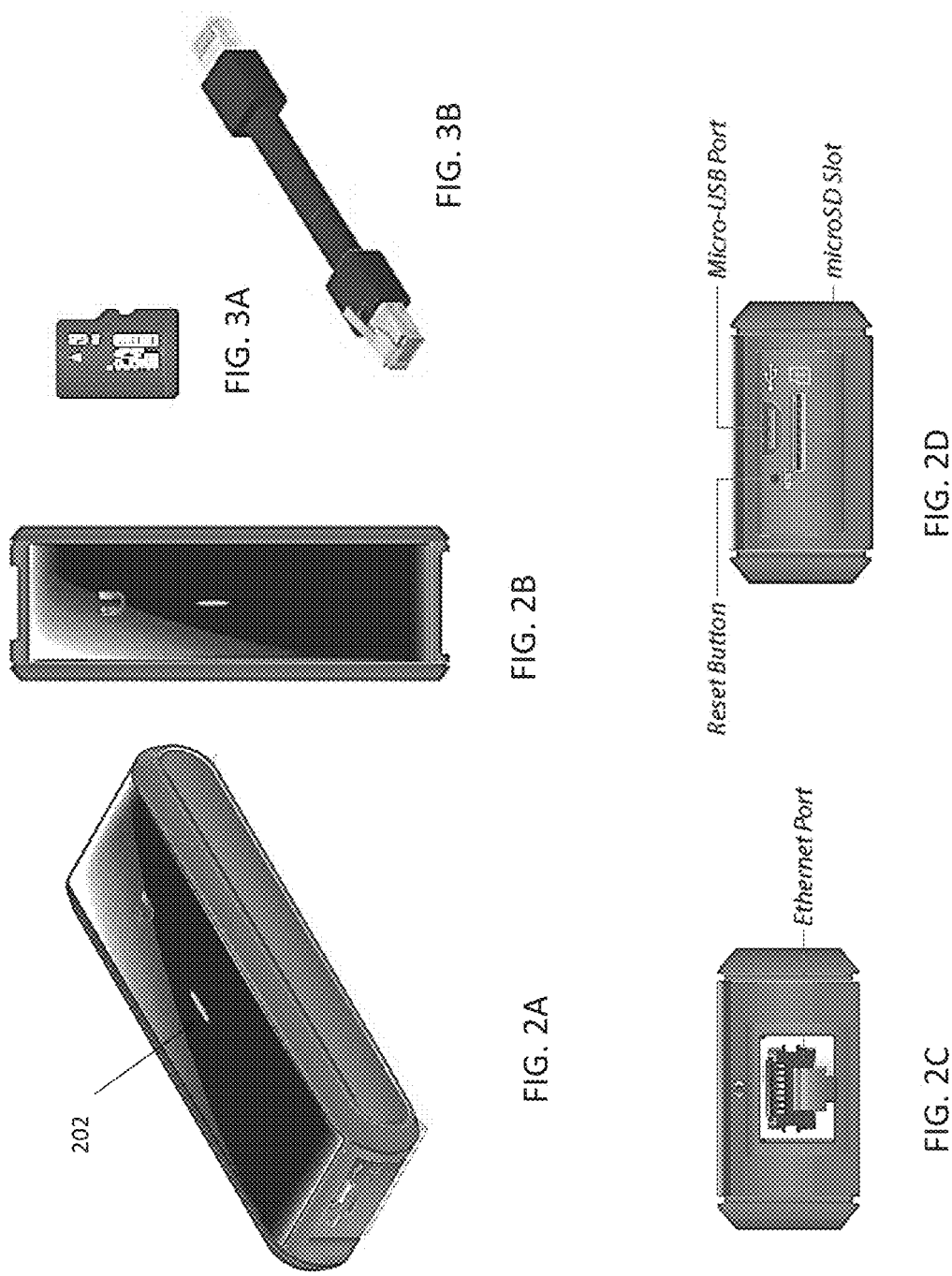

| | GRM-P |
|---|---|
| Dimensions | 21.7 x 43.4 x 121.9 mm (0.85" x 1.71" x 4.80") |
| Weight | 110 g (3.88 oz) |
| Networking Interface | (1) 10/100/1000 Ethernet Port |
| Buttons | (1) Reset to Defaults |
| Power Method PoE | 48V 802.3af or Passive PoE (Pairs 4, 5+; 7, 8 Return) |
| Micro-USB | 5V |
| Power Supply | 802.3af PoE or Micro-USB 5V, 1A |
| Max. Power Consumption | 5W |
| Certifications | CE, FCC, IC |
| Operating Temperature | 0 to 40° C (32 to 104° F) |
| Operating Humidity | 20 to 90% Noncondensing |

FIG. 5

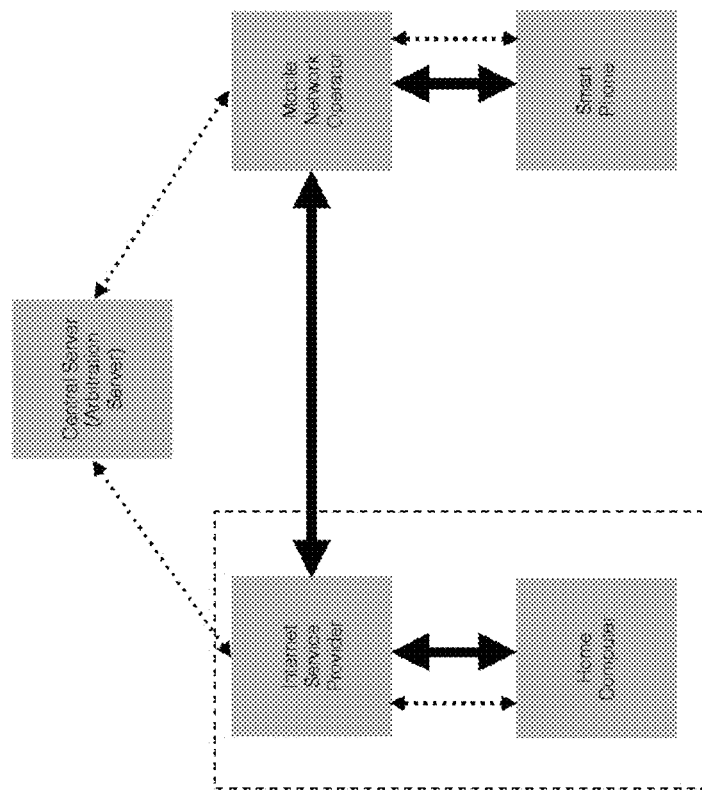
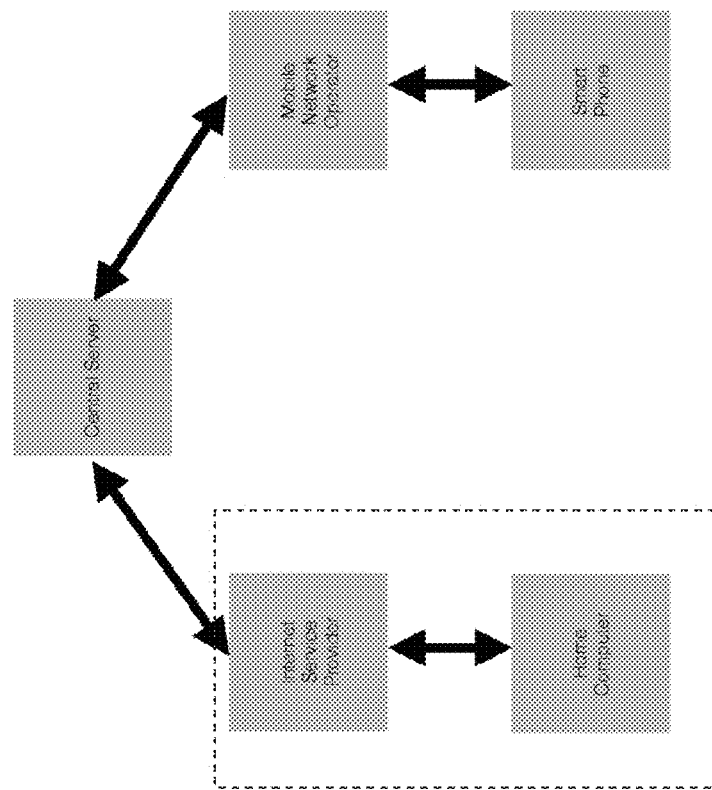
FIG. 8B
FIG. 8A

FIG. 12 though the patent application claims priority to U.S. provisional patent application No. 62/233,279, filed on Sep. 25, 2015, and titled "HYBRID LOCAL AND CLOUD-BASED CONTROLLER FOR MONITORING NETWORKS," which is herein incorporated by reference in its entirety.

COMPACT AND INTEGRATED KEY CONTROLLER APPARATUS FOR MONITORING NETWORKS

CROSS REFERENCE TO RELATED APPLICATIONS

This patent application claims priority to U.S. provisional patent application No. 62/233,279, filed on Sep. 25, 2015, and titled "HYBRID LOCAL AND CLOUD-BASED CONTROLLER FOR MONITORING NETWORKS," which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Methods and apparatuses (including systems and devices) for monitoring and provisioning of Wi-Fi networks in both outdoor and indoor locations. These apparatuses and methods may be particularly useful for small and large enterprises and in particular wireless internet service providers (WISPS) that use Wi-Fi to provide the last-mile broadband.

BACKGROUND

Generally, methods of managing Wi-Fi networks (of large, intermediate or small sizes) may include provisioning and configuring the networks, monitoring the health of the networks in real-time, and analyzing network data (which can be large amounts of data requiring complex processing and lots of processor time) to provide network health indicators. Current solutions for network monitoring are typically divided up into local and cloud-based (or remote) control systems and methods. A locally controlled method/system may include a local controller (e.g., physical hardware) and/or software installed on a local PC/server. The system manager can then use the local system from within the security of the existing network, e.g., behind the firewall, to manage the network; because this is done without leaving the firewall it is very secure, however, the intensive processing required may limit the amount of analysis and the sizes of the networks that can be monitored in this manner. In short, local controllers are typically inside firewalls and hence are good at real time monitoring, but are limited by available space and computing capacity and hence cap the number of devices that can be monitored by one instance. Such local systems/methods do not provide a holistic view of the network and are also are not suitable for big-data analysis of network data to provide insights because of computational and storage restrictions.

In contrast, cloud-based (remote) methods/systems typically use a cloud-based controller in which all network data is sent to a cloud (remote server) for monitoring/alerts. Because of the access to large processors and memory, such cloud-based/remote systems and methods are very good at handling large amounts of data (large networks) and can provide a very high level of analysis, data manipulation and data storage. Such cloud controllers are good at passive analysis of large data sets, however they may suffer from network latency, and the need to send frequent data for real-time alerts. Typically remote/cloud-based network controllers and monitors may need a device to push the data (that is generally inside one or more firewalls) or they must maintain expensive (and potentially risky) open socket connections. Thus, cloud-based controllers may suffer from a real-time versus scale problem, typically because of firewalls.

What is needed is a system that allows the benefits of both local and cloud approaches while avoiding or minimizing the problems addressed above. Specifically, what is needed is a hybrid approach that permits scalable, real-time analysis and processor-intensive analytics behind and maintaining the integrity of the network firewall(s). Described herein are apparatuses and methods that may address these needs.

SUMMARY OF THE DISCLOSURE

Describe herein are compact and integrated local key controller apparatuses for remotely managing a network of wireless devices that are connected to a computer network switch. These apparatuses (including devices and systems) and methods of using them may provide secure and fully integrated, stand-alone wireless network controllers that may be accessed remotely without compromising the integrity of the network's firewall.

For example, described herein are compact and integrated local key controller apparatuses for remotely managing a network of wireless devices connected to a computer network switch. These apparatuses may include: a housing; an Ethernet connection configured to connect to the computer network switch connected to a plurality of network devices including a plurality of wireless access points behind a firewall; a processor within the housing, the processor configured to: identify the local key controller apparatus to a remote server (e.g., up on connection of the apparatus to the computer network switch); authenticate a request from a remote computer outside of the firewall to communicate with the local key controller apparatus; communicate a controller information directly with the remote computer without passing the controller information through the remote server, wherein the controller information comprises monitoring information about the network devices and computer network switch information; receive a modification information from the remote computer without passing the modification information through the remote server; and modify the computer network switch, the network devices, or both the computer network switch and network devices based on the modification information.

As mentioned, these apparatuses may generally be compact and integrated. For example, in any of these apparatuses the housing encloses a volume that is less than 0.5 cm$^3$ (e.g., 0.5 cm$^3$ or less, 0.4 cm$^3$ or less, 0.3 cm$^3$ or less, 0.2 cm$^3$ or less, 0.17 cm$^3$ or less, 0.15 cm$^3$ or less, 0.125 cm$^3$ or less, 0.1 cm$^3$ or less, etc.) and wherein the apparatus weighs less than 200 g (e.g., 200 g or less, 175 g or less, 150 g or less, 125 g or less, 110 g or less, 100 g or less, etc.). These apparatuses may include a processor, but may not include a screed, display or the like, or user inputs (beyond a simple reset control/button), etc. For example, any of these apparatuses may include a single button on the housing configured as a reset button. Any of these apparatuses may also include a memory card slot configured to hold a removable memory. One or more indicator lights (e.g., LEDs) may be visible on or through the housing.

In general, the apparatus may receive power from a power over Ethernet (PoE) connection or an adapter for providing power in addition to a separate Ethernet connection. For example, in some variations the Ethernet connection comprises a power of Ethernet (PoE) connection.

In general, the processor may be configured to communicate controller information (e.g., to the remote computer). The processor may be configured to gather and transmit controller information, wherein the controller information comprises one or more of: monitoring information about the network devices including one or more of: network device name, IP address, connectivity status (number of connections, etc.), activity, down/up time; latency of the network; network throughput; radio frequency (RF) channel information; computer network switch information including one or more of: port name, status, transmitting/receiving (Tx/Rx), PoE capability; RF performance analysis; and RF monitoring and device mapping.

Alternatively or additionally, the processor may be configured to modify the computer network switch, the network devices, or both the computer network switch and network devices based on the modification information received from the remote computer; this modification information may include one or more of: network device configuration information, LAN and WLAN group assignments for the network devices, provisioning of the network devices, radio frequency (RF) band steering, WAN/LAN/VLAN configuration of the computer network switch, and operation mode configuration for one or more ports on the switch.

For example, described herein are compact and integrated local key controller apparatus for remotely managing a network of wireless devices connected to a computer network switch, the apparatus comprising: a housing; a power over Ethernet connection configured to connect to the computer network switch connected to a plurality of network devices including a plurality of wireless access points behind a firewall; a processor within the housing, the processor configured to: identify the local key controller apparatus to a remote server when the apparatus is connected to the computer network switch; authenticate a request from a remote computer outside of the firewall to communicate with the local key controller apparatus; communicate controller information directly between with the remote computer without passing the controller information through the remote server, wherein the controller information comprises one or more of: monitoring information about the network devices including one or more of: network device name, IP address, connectivity status (number of connections, etc.), activity, down/up time; latency of the network; network throughput; radio frequency (RF) channel information; computer network switch information including one or more of: port name, status, transmitting/receiving (Tx/Rx), PoE capability; RF performance analysis; and RF monitoring and device mapping; receive a modification information from the remote computer without passing the modification information through the remote server; and modify the computer network switch, the network devices, or both the computer network switch and network devices based on the modification information, wherein the modification information comprises one or more of: network device configuration information, LAN and WLAN group assignments for the network devices, provisioning of the network devices, RF band steering, WAN/LAN/VLAN configuration of the computer network switch, and operation mode configuration for one or more ports on the switch.

Also described herein are methods of operating any of the compact and integrated local key controller apparatuses described herein, as well as methods of remotely controlling a network using a compact and integrated local key controller apparatus.

For example, a method of remotely controlling a network using a compact and integrated local key controller apparatus may include: connecting the local key controller apparatus to a port of a computer network switch behind a firewall, wherein the computer network switch is connected or configured to connect to a plurality of network devices including a plurality of wireless access points; identifying the local key controller apparatus to a remote server; receiving a request from a remote computer outside of the firewall to communicate with the local key controller apparatus; authenticating the request; communicating controller information directly between the local key controller apparatus and the remote computer without passing the controller information through the remote server, wherein the controller information comprises monitoring information about the network devices and computer network switch information; communicating modification information from the remote computer to the local key controller apparatus without passing the modification information through the remote server; and modifying the computer network switch, the network devices, or both the computer network switch and network devices based on the modification information.

In any of these methods, communicating controller information may include displaying a graphical user interface displaying the controller information on the remote computer. As mentioned above, the local key controller apparatus may identify itself to the remote server upon connection to the computer network switch.

Receiving the request from the remote computer may comprise receiving the request in the remote server. Authenticating the request may comprise providing a secure and private single sign-on (SSO).

Communicating controller information may comprise communicating monitoring information about the network devices including one or more of: network device name, IP address, connectivity status (number of connections, etc.), activity, down/up time. Alternatively or additionally, communicating controller information comprises communicating one or more of: latency of the network; network throughput; radio frequency (RF) channel information; computer network switch information including one or more of: port name, status, transmitting/receiving (Tx/Rx), PoE capability; RF performance analysis; and RF monitoring and device mapping.

Modifying the computer network switch, the network devices, or both the computer network switch and network devices may comprise modifying based on the modification information comprising one or more of: network device configuration information; LAN and WLAN group assignments for the network devices; provisioning of the network devices; radio frequency (RF) band steering, WAN/LAN/VLAN configuration of the computer network switch, and operation mode configuration for one or more ports on the computer network switch.

For example, described herein are methods of remotely controlling a network using a compact and integrated local key controller apparatus, the method comprising: connecting the local key controller apparatus to a port of a computer network switch behind a firewall, wherein the computer network switch is connected or configured to connect to a plurality of network devices including a plurality of wireless access points; identifying the local key controller apparatus to a remote server, wherein the local key controller apparatus identifies itself to the remote server upon connection to the computer network switch; receiving a request from a remote computer outside of the firewall to communicate with the local key controller apparatus in the remote server; authenticating the request; communicating controller information directly between the local key controller apparatus and the remote computer without passing the controller information through the remote server, wherein the controller information comprises one or more of: monitoring information about the network devices including one or more of: network device name, IP address, connectivity status (number of connections, etc.), activity, down/up time; latency of the network; network throughput; radio frequency (RF) channel information; computer network switch information including one or more of: port name, status, transmitting/receiving (Tx/Rx), PoE capability; RF performance analysis; and RF monitoring and device mapping; communicating modification information from the remote computer to the local key controller apparatus without passing the modification information through the remote server; and modifying the computer network switch, the network devices, or both the computer network switch and network devices based on the modification information, wherein the modification information comprises one or more of: network device configuration information, LAN and WLAN group assignments for the network devices, provisioning of the network devices, RF band steering, WAN/LAN/VLAN configuration of the computer network switch, and operation mode configuration for one or more ports on the switch.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 2A is a perspective view of an example of a compact and integrated local key controller apparatus for remotely managing a network of wireless devices, which may also be referred to herein as a local controller ("key").

FIGS. 2B, 2C and 2D show side, bottom and top views, respectively of the apparatus of FIG. 2A.

FIG. 3A is an example of a secure, digital nonvolatile memory (e.g., microSD card) that may be used with the apparatus of FIGS. 2A-2D.

FIG. 3B is an example of a connector (e.g., Ethernet cable) that may be used with the apparatus of FIGS. 2A-2D.

FIG. 5 shows exemplary (illustrative only) parameters for a local controller ("key") apparatus such as the one shown in FIGS. 2A-2D.

FIG. 8A illustrates a traditional topology for communicating between a devices (including devices that are part of a network communicating with an outside device.

FIG. 8B illustrates an example of an alternative topology based on a WebRTC-type of topology.

FIG. 12 is an example of a user interface displaying device information from a local key controller apparatus as described herein.

DETAILED DESCRIPTION

Described herein are compact and integrated local key controller apparatuses for remotely managing a network of wireless devices that are connected to a computer network switch. These apparatuses (including devices and systems) and methods of using them may provide secure and fully integrated, stand-alone wireless network controllers that may be accessed remotely without compromising the integrity of the network's firewall.

The local key controller apparatuses described herein may include an integrated computer and software controller in an extremely small form factor. For example, the apparatus may include a processor (e.g., a quad-core processor with 1 GB RAM), and may be configured to operate as a controller capable of configuring and managing multiple (2 or more, 3 or more, 4 or more, 5 or more, 6 or more, more than 10, more than 20, more than 30, etc.) network devices.

In general, these apparatuses may be connected directly to a switch, router, or combined router and switch forming a network or portion of a network. The apparatus may therefore be installed behind the network firewall, and yet may be accessed remotely by a remote computer or processor after authentication. Authentication may be through providing a secure and private SSO (Single Sign-On). Thus, the switch and/or a plurality of network devices connected to the switch may be accessed remotely from outside of the firewall without requiring a third-party, e.g., hosted cloud service. In some variations, the local key apparatus may be configured to provide monitoring and control access to secure data on the network by establishing direct peer-to-peer communication without passing the information to an intermediary server, such as a cloud server, thus secure data and network information remains local and secure in the network.

The apparatuses and methods described herein are also scalable and may be configured to allow provisioning, configuring, monitoring, and managing of network devices from a single or multiple networks from a central control plane. The local key controller apparatus for remotely managing a network of wireless devices connected to a computer network switch may be accessible through a standard web browser, and used to control one or more networks.

Figure 1A:
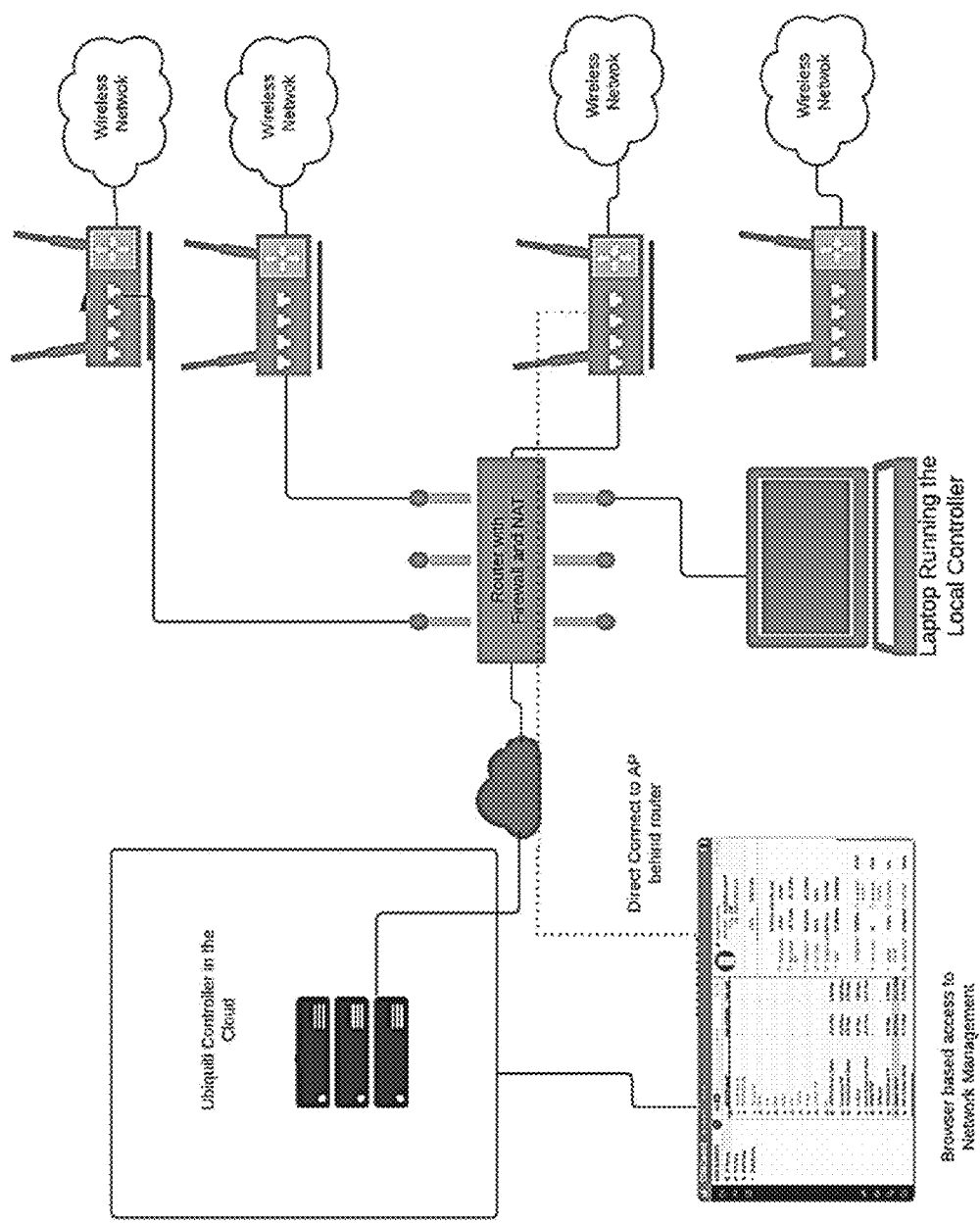
FIG. 1A is an illustration of one example of a compact and integrated local key controller apparatuses coupled to an exemplary network.
Figure 1B:
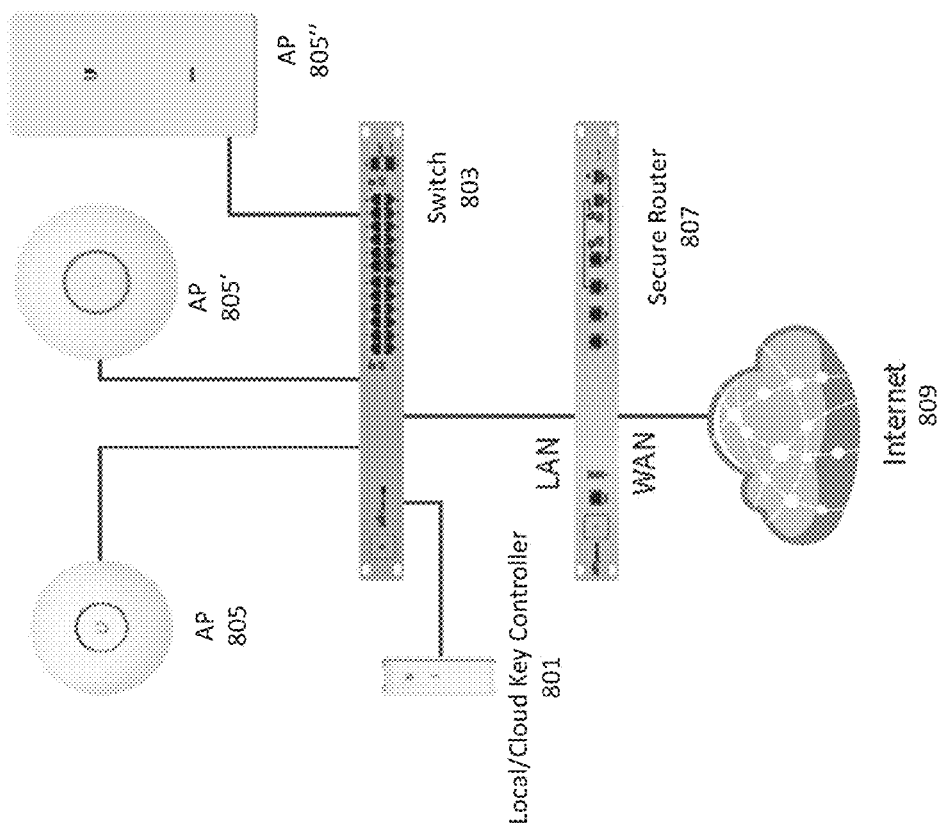
FIG. 1B is another example of a network including a compact and integrated local key controller apparatuses.
Figure 1C:
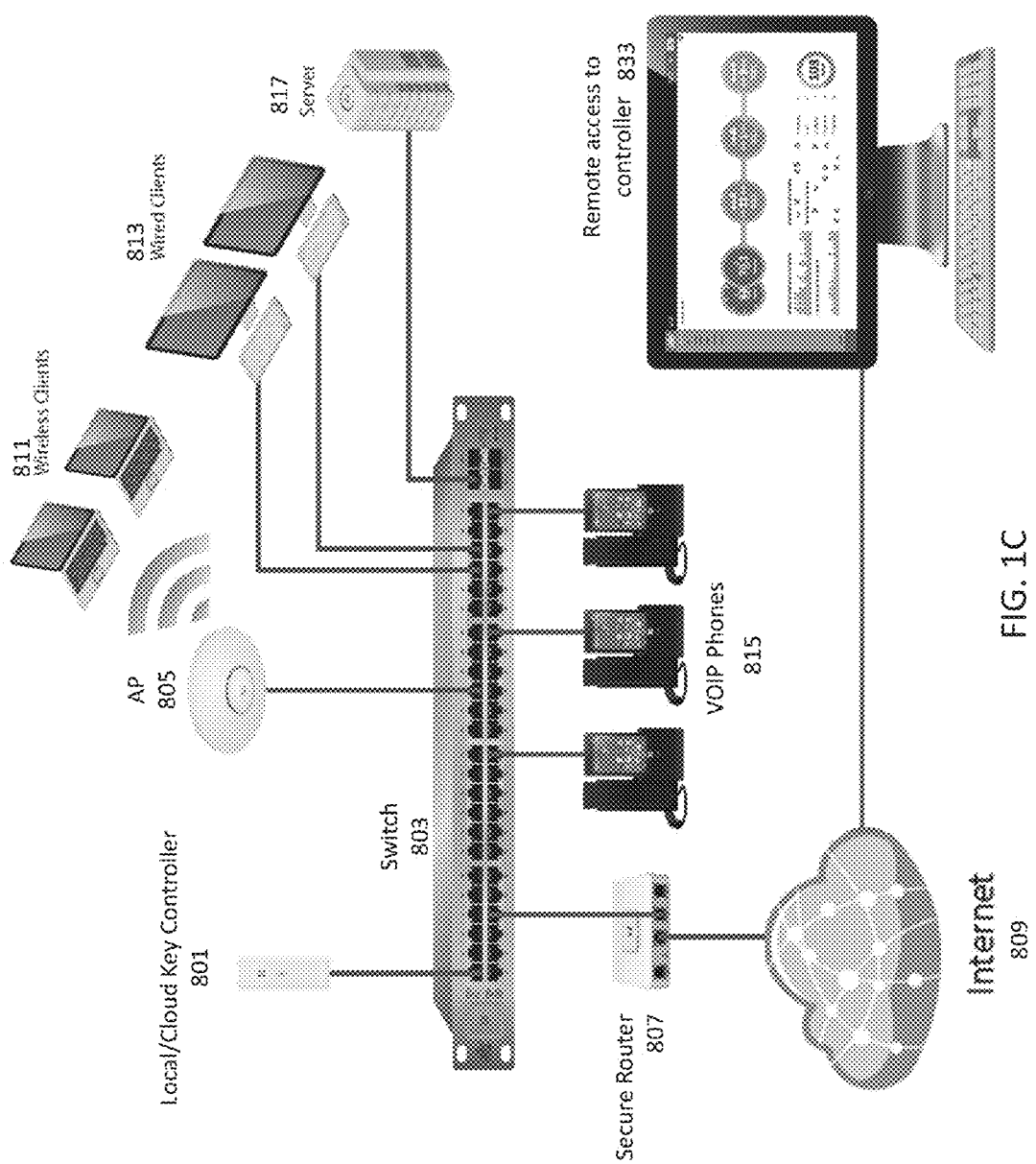
FIG. 1C is another example of a network including a compact and integrated local key controller apparatuses.
Figure 7:
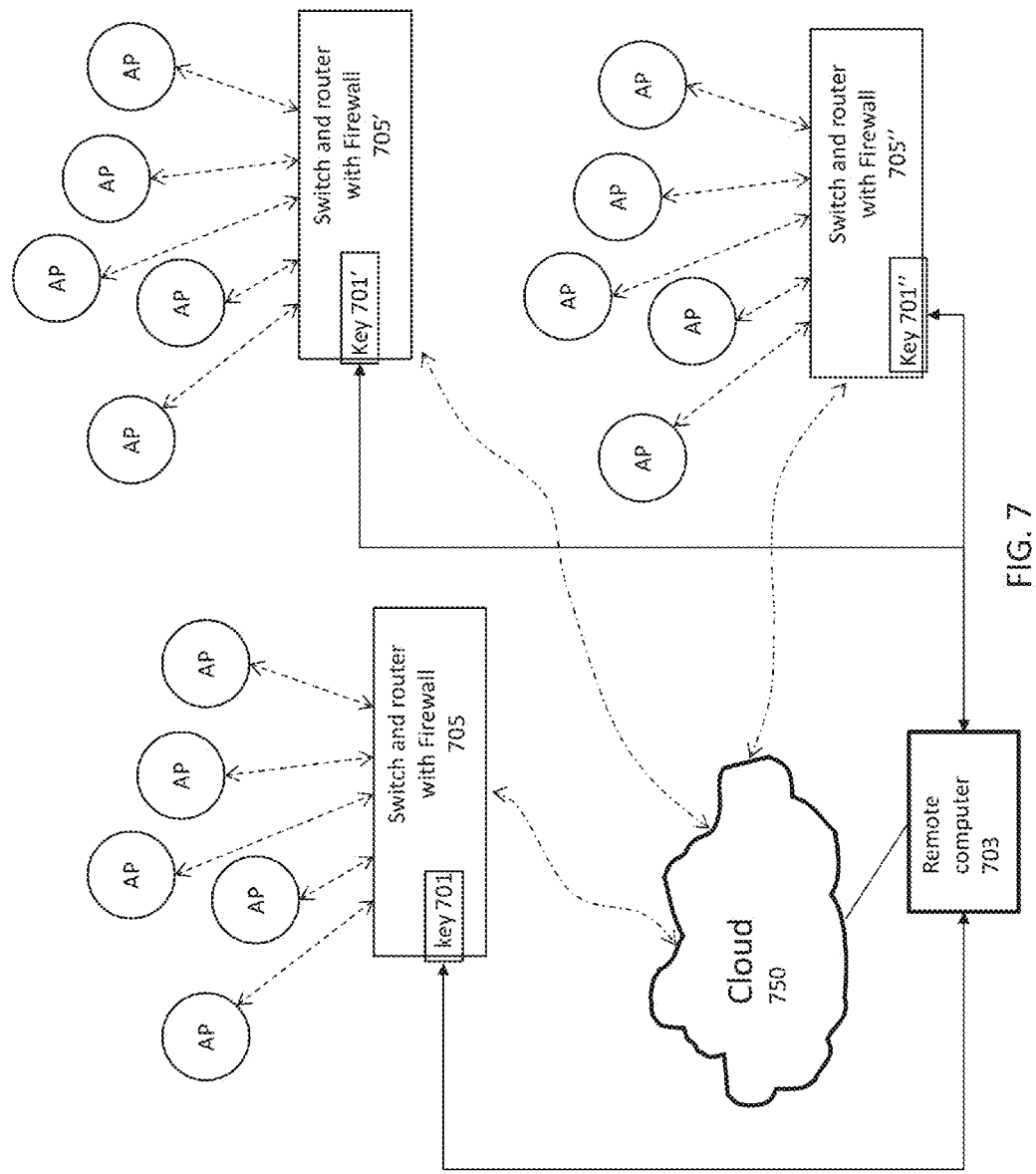
FIG. 7 is an example of a network including a plurality of local networks (local access points) that may be monitored, controlled, etc. using the apparatuses and methods described herein.

For example, FIGS. 1B and 1C illustrate one example of a compact and integrated local key controller apparatus for remotely managing a network of wireless devices connected to a computer network switch. In FIG. 1B, for example, a network includes a switch 803 and secure router 807 that may connect to the internet 809. The network also includes a plurality of network devices, including a plurality of wireless access points (APs) 805, 805', 805" connected to the switch 803. A local key controller apparatus is connected view a power over Ethernet (PoE) connection to a port of the switch 803. Similarly, FIG. 1C illustrates another example of a network including a plurality of network devices. In this example, the network devices include at least one wireless access point (AP) 805 (communicating with one or more wireless clients 811) that is coupled to the switch 803, as well as one or more wired clients 813 connected to the switch 803, as well as a plurality of VOIP phones 815. The switch is also shown connected to a server 817. The network includes a secure router 807 connecting the network, which may be protected by a firewall to the internet. A remote computer 833 may connect to the network through a local key controller apparatus 801 connected directly to the switch 803. The local key controller apparatus may provide convenient management of the network by the remote computer; the local key controller apparatus may include hardware, firmware and/or software that allows network administrator to configure and monitor network devices (and/or the switch, and/or router) using a graphical user interface without the need for separate software or hosting. FIG. 7 is another schematic illustrating the use of multiple local key controller apparatuses each coupled to a network 705, 705', 705" behind respective firewalls and each communicating with a single remote computer, which may allow aggregating of network data from each of the local networks; communication between each key 701, 701', 701" and the remote computer 703 may be through the cloud 705, direct (e.g., peer-to-peer once the cloud server links the two), or a hybrid of the two, as described in greater detail below.

As described herein local key controller apparatuses installed at each network deployment site may provide an always-on, private remote monitoring and control. Every site may be made accessible through its assigned secure SSO. Each local key controller apparatus may provide its own network monitoring, configuration, maps, statistics, and administration accounts, and these accounts may be aggregated together.

For example, described herein are compact and integrated local key controller apparatuses for remotely managing a network of wireless devices connected to a computer network switch. These apparatuses may also or alternatively be referred to herein as hybrid local and remote (cloud-based) controller apparatuses for monitoring, analyzing and/or modifying WiFi networks, including the switch and network devices. These methods and apparatuses may provide real-time monition and modification of a network, including real-time network alerts and may use a local controller (e.g., inside the firewall or walls) while permitting logs, analysis and data mining either within the firewall, at a remote but authenticated server, without communicating sensitive information through a remote (cloud) server, or at a cloud-based controller. A cloud-based portal may provide a secure tunnel to access between a remote computer and the local controller (e.g., the compact and integrated local key controller apparatus) for monitoring, modifying and provisioning network devices from anywhere on the internet.

Some variations of the approaches described herein may partition the network management functions across local and remote computers and/or cloud controllers to provide real time monitoring, analysis and control at scale. Thus, these methods and apparatuses (e.g., systems and devices, including software) may be referred to partitioned WiFi network management apparatuses and methods.

For example, FIG. 1A shows a schematic of a control flow for Wi-Fi network monitoring using a controller that uses a hybrid or partitioned approach. In this example, a local computer (e.g., laptop) operates as a controller running local controller software and is connected to the network(s) to be monitored/controlled at the computer network switch. The local controller may act as a "key" or "point" and may be integrated into a dedicated compact, lightweight and energy efficient apparatus (a compact and integrated local key controller apparatus) having advantages over just software alone (e.g., running on a general-purpose computer, as shown in FIG. 1A; an example of a compact and integrated local key controller apparatus is described in greater detail in FIGS. 2A-5, below. In general, the local controller includes a physical connector (e.g., cable connection) to the network, e.g., a switch/router which may be connected to one or more access points, or any other networked device, including one or more access points, customer provided equipment (CPE) or any other device. Generally, the key may be connected (via, e.g., Ethernet connection) to a router. Thus the key is connected within the firewall of this local network. The key may provide access to the local network (e.g., to a laptop or other processor running the local controller interface). The key then communicates with the remote server (e.g., cloud) which may provide browser-based access to the network management.

In the example shown in FIG. 1A an auxiliary controller or controller client may be present in the cloud and/or connected through the cloud. For example, after connecting a key to a network (e.g., to a switch or router), the key may then register itself with a cloud-based controller using, e.g., websockets. The key may then provide STUN/TURN ("Session Traversal Utilities for NAT/Traversal Using Relays around NAT", where NAT refers to Network Address Translation) parameters to the cloud controller. The local controller may also be adopted into the user account for the monitoring domain when signing into the cloud. The cloud controller may then registers the STUN/TURN parameters onto its STUN/TURN server, and a WebRTC enabled browser may contact the cloud controller to get a list of registered local controllers. In some variations, the the cloud may be used to perform (e.g., processor-intensive) analysis components based on the network data provided. Alternatively, using this configuration, the local controller (e.g., a compact and integrated local key controller apparatus) may communicated in a peer-to-peer relationship with an external (remote) computer and may perform display (e.g., monitoring, etc.), analytics (including processor-intensive analytics) and management, including issuing control commands to adjust the switch and/or network devices, without transmitting any data from the local network to or through the cloud (including the cloud server). As used herein a remote computer may refer to any computing device capable of communicating directly with the compact and integrated local key controller apparatus, including a laptop computer, a desktop computer, a wearable computer, a smartphone, a pad, etc.

For example, FIG. 8B illustrates an example of a WebRTC-type topology which lets two remotely positioned peer devices exchange data efficiently. As mentioned above, any of the apparatuses described herein may be configured to permit such direct peer-to-peer communication between a compact and integrated local key controller apparatus and a remote computer by adapting a WebRTC-type topology for use with the apparatuses and methods described herein. For example, compare FIG. 8A with FIG. 8B. FIG. 8A shows a typical centralized communication topology in which a first network, including a home computer and internet service provider) communicate through a central server to a remote computer (in this example, a smart phone) that connects to a separate network (a mobile network operator). In this example, the remote device (smartphone) communicates in a centralized manner as shown by the black arrows, which may result in a risk to the reliability, should the centralized server go out of order, and increased cost. Although data transmitted between the remote device (phone) and home computer (on the first network) may be encrypted, and protected by a firewall; the data transmitted must be passed through the central server, resulting in an actual or perceived security risk. In contrast, the topology shown in FIG. 8B is a decentralized one based on an WebRTC ("Web Real Time Communication") architecture, in which there are two kinds of traffic: the dotted arrows represent data exchanged between the local device (behind the firewall) and the remote device (phone) through the central server which is primarily network address and identity information, and the solid lines represent the majority of the local data. The network address and identity information may be referred to as presence data and typically makes up an insignificant fraction of the transferred data (<1%), and may include information such as: online or not, internet address, identity, authentication, etc. The resulting decentralized topology may be adapted for use with the apparatuses and methods described herein, in which the apparatus, when connected to the switch, may communicate with a remote server (e.g., arbitration server) to provide presence data, but not any of the user data otherwise protected behind the network firewall. A remote computer may request communication with the apparatus (e.g., to monitor and/or control the network) by contacting the apparatus through the arbitration server, and once the remote computer is authenticated, a direct connection between the apparatus and the remote computer may be established, as shown, for example, in FIG. 9. In this example, the first three boxes in the sequence diagram shown correspond to the dotted lines in FIG. 8B. They represent an insignificant amount of data in terms of the amount of data transferred (e.g., <1%); the majority of the data transferred occurs in the fourth box, once the peer to peer communication has been established. In this example, the remote computer may be Peer A and the local key controller apparatus may be Peer B (or vice versa).

In practice, the locally and physically installed key may communicate and transmit network data to a remote computer directly in a highly secure manner that maintains the integrity of the network firewall, permitting real-time local monitoring, alerts and reporting, while also allowing remote analytics and storage of historical and relational information. In some examples metadata extracted from the secure network data may then be passed on to cloud server for storage and/or further processing; alternatively this data may be restricted to the local computer. In some variations, software on a remote computer (which may be just a browser or it may be dedicate software for communicating with the apparatus described herein) may be linked to the key and may communicate directly with a network locally through the key while still accessing cloud-based information and analytics.

In variations in which the compact and integrated local key controller apparatus transmits information to the cloud, after installing the local controller (compact and integrated local key controller apparatus), the key may determine (e.g., intelligently decide) what information is sent to the cloud, which may be done at predetermined (non-real time) periods. Real-time/local processing may be allowed to a processor (e.g., laptop, computer, iphone, etc.) that is specifically and securely paired to the key, and to any number of keys (e.g., other networks or other devices on/in the network).

Figure 9:
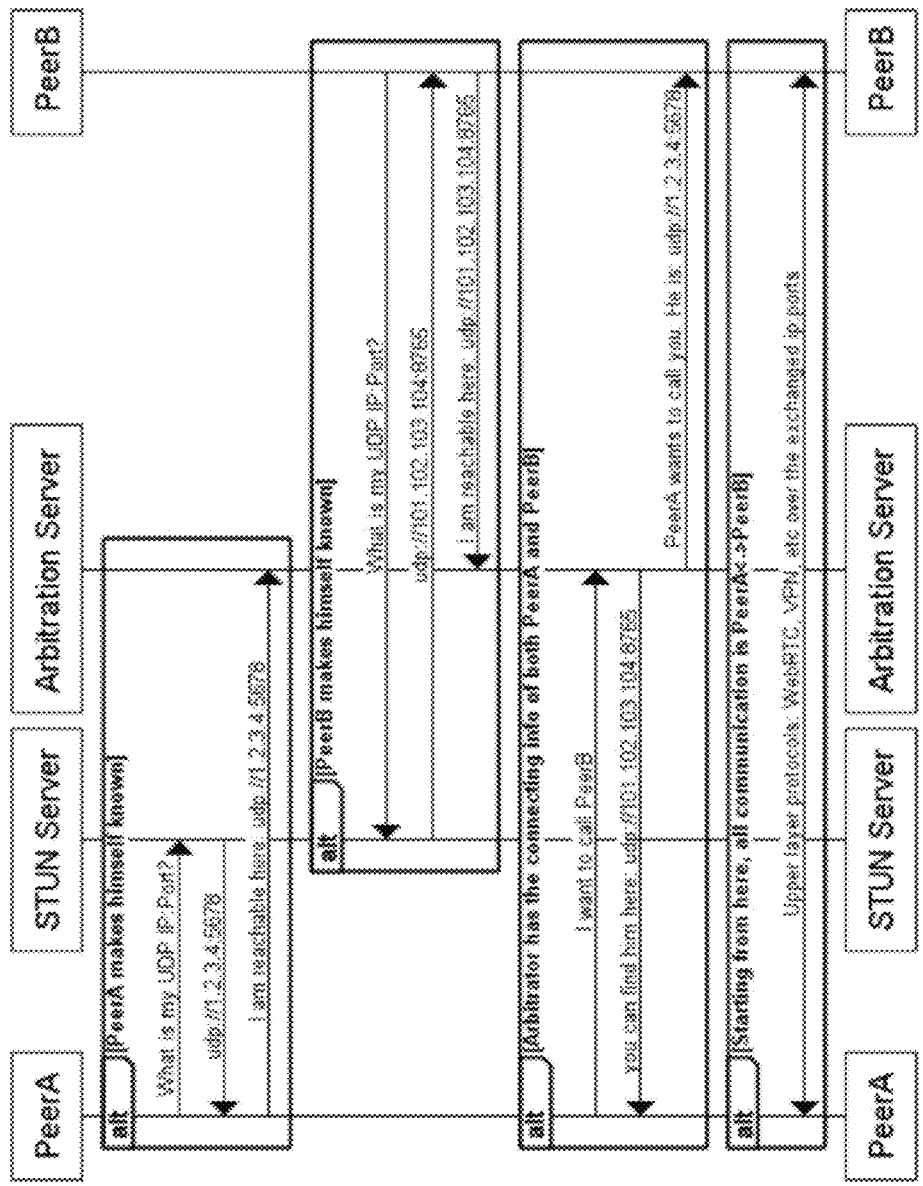
FIG. 9 illustrates a sequence of communication steps using a hybrid peer-to-peer topology such as may be implemented using any of the local key controller apparatuses described herein.

When the key is first connected to a device and/or network, it may communicate with the cloud (remote processor) to identify itself. The key may send tunneling information for the key (e.g., through firewall). The key (compact and integrated local key controller apparatus) may then communicate directly (e.g., via websocket) with the cloud, and may provide this access to the paired device (e.g. remote computer). When the paired device (e.g., laptop, smartphone, etc.) wants to connect to the controller, e.g., to locally/real-time monitor and/or get reports and modify network behavior, the cloud server may directly connect the paired device with the key and the cloud may redirect to the two to communicate directly, similar to what is shown in FIGS. 8B and 9.

For example, a paired remote computer may communicate with the cloud via a browser (web browser) and may send/receive information from the cloud (e.g., analytics on the network(s) associated with that paired device); the paired device may additionally or alternatively communicate directly with the network(s) in a direct (local or pseudo-local) manner. For some functions (e.g., real-time monitoring/alerts, etc.) the control software may therefore communicate directly and securely communicate with the control key (cloud key or compact and integrated local key controller apparatus) which may look like a dongle or other apparatus connected to network hardware (e.g., router, switch, access point, CPE, etc.). This key may initially introduce itself to the remote (e.g., cloud) server, and may, at initialization, be adopted into the user account associated with a particular user/paired device (e.g., laptop). The SSO of the paired device/user may be added on the cloud, to provide the user with access to the key within the firewall.

The user may then use the local (compact and integrated local key controller apparatus) apparatus for interaction within the firewall (e.g., in real-time), but may set up a communicate session through the cloud. Alternatively, as mentioned above, in some variations the compact and integrated local key controller apparatus may provide data to the remote (cloud) server to provide cloud-specific matters, such as the more analytic data on overall network health. Alternatively or additionally, a cloud portion (e.g., a cloud controller) may redirect a paired user/apparatus to the correct key/keys and the locally installed key may provide the local information to the paired remote computer, either without (in a first, peer-to-peer configuration) sending network data/information to the cloud for processing and/or storage, or with (in a cloud-analytics mode) sending network data/information to the cloud for processing and/or storage, or in a hybrid configuration in which some network data/information is sent to the cloud for processing and/or storage and some is kept at just the remote computer. Thus, the key apparatus may be smart enough to send to the cloud the information that it needs for the analysis, or to restrict the data (secure network data) to the remote computer. In some variations the apparatus may be configured to allow a local user to select which mode of operation that that apparatus with act in.

Thus, in practice, the user may configure the system to include or exclude the cloud (e.g., the transmission of data to/from the cloud) and/or may determine, limit or prevent the types of data (or aggregation, averages, sets, etc. of data) to be sent to the cloud, and/or the timing of transmission of data to the cloud server. As used herein the term "cloud" may refer to any remote processor, computer, system, etc., including in particular a remote server. The user, e.g., upon installing a key onto a network or network device, may configure the key to determine which permissions (e.g., paired devices) to allow and pair. The key may be limited to a single paired device. Further, as mentioned above, the key may determine how to partition information (e.g., which information is sent to the cloud and/or remains locally).

FIGS. 2A-2D illustrates one example of an embodiment of a key (which may also be referred to as a point or local key controller apparatus) as described herein. FIG. 2A shows a front perspective view. In this example, the apparatus may include indicators 202 (e.g., LEDs) showing status, (default, busy/processing, working properly, etc.). FIG. 2B shows a top view including the indicator, which may be one or more colored LEDs to designate the status. FIG. 2C shows a view of the top panel, showing a connector (Ethernet port) for connecting to a network. A connector such as the one shown in FIG. 3B may be used. FIG. 2D shows a bottom panel of the local key controller apparatus, including control (e.g., reset button), an alternate connector (micro-USB) and a memory card (e.g., microSD) port. The first connector (e.g., Ethernet port) may be used (e.g., gigabit Ethernet port) to connect the power and may be connected to the network devices such as a LAN and/or DHCP server. Power can be provided by, e.g., a power-over-Ethernet (PoE) switch. The control button may be, e.g., a reset button or switch that can be used to restore factory default settings and/or to reset the apparatus. The second connector shown is a micro-USB connector and may generally be used to provide an optional power source, e.g., if PoE is not available. This is shown in FIG. 4D.

Figure 4B:
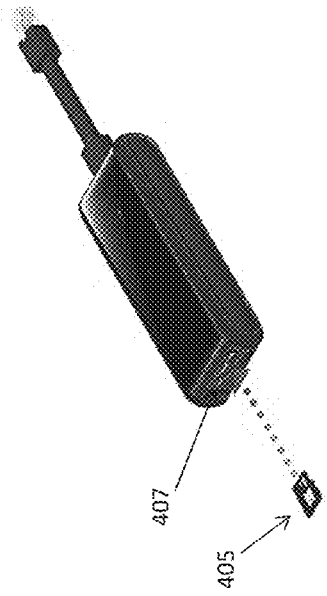
FIGS. 4A-4D illustrate one method of connecting and/or installing the apparatus of FIGS. 2A-2D.
Figure 4D:
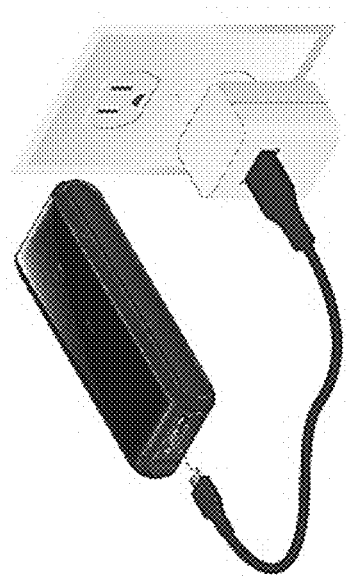
Figure 4A:
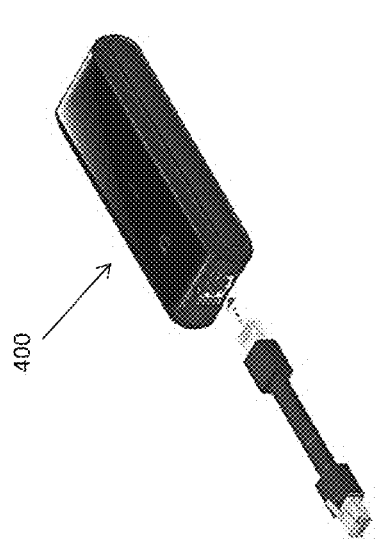
Figure 4C:
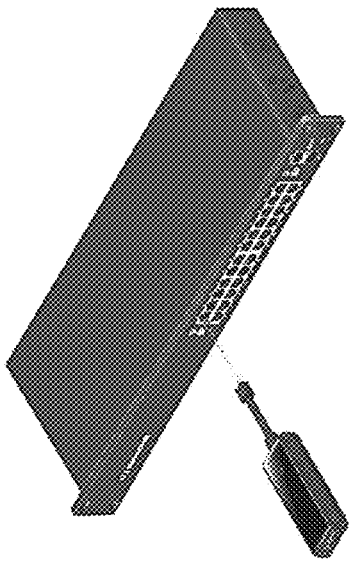

FIGS. 4A-4D illustrate one variation of a method of connecting a key 400 to a network. In FIG. 4A, the key 400 is first connected to the connector/cable (Ethernet cable) at the connector port on the key. In FIG. 4B a removable memory card 405 (microSD Card shown in FIG. 3A) is inserted into the receiver (shown as a microSD slot 407 on the key). The other end of the cable may then be connected to a port on a network switch or other device. In FIG. 4C the key is connected to a port on a network switch. The apparatus may then be powered on and configured. For example, as shown in FIG. 4D, the apparatus may be connected to a USB power source such as a USB cable connected to a wall power line. FIGS. 1B and 1C, discussed above, illustrate the use of a local key controller apparatus such as the ones shown in FIGS. 2A-4D in various network environments. FIG. 5 illustrates exemplary characteristics of one example of a local key controller apparatus. These parameters (including dimensions, weight, networking interface, power supply, max power consumption, operating temperature, etc.) are for illustration only; in general, these devices may be small and lightweight, and may be easily attached to a network (e.g., a switch or other component) and secured with the network component(s), e.g. in a rack.

The local key controller apparatus may have control user interface software preinstalled, which may be accessed by the remote computing device (e.g., laptop, phone, etc.) to be paired with it. For example the software may be accessed by connecting the device to be paired (which includes an internet connection) to the same Layer-2 network as the key. The key may be set to DHCP by default, and may therefore try to obtain an IP address; the IP address may be assigned (e.g., by the user or by a DHCP server, etc.). Alternatively, the device may be pre-assigned with an IP address. The device to be paired may then be connected, e.g., by internet browser, to the IP address of the key.

Figure 6A:
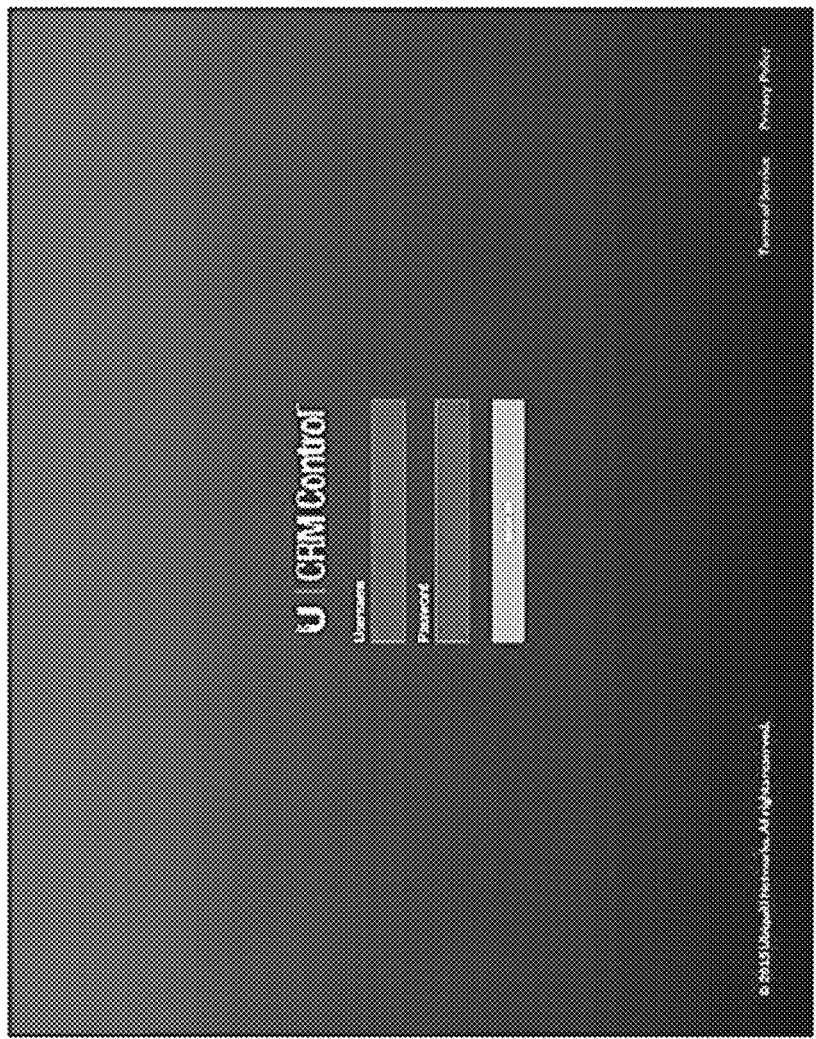
FIGS. 6A-6C illustrate exemplary user interfaces for communicating with one or more local controllers to monitor, control, (including setup) or otherwise analyze and/or provision a network using one or more local controller ("keys") as described herein.
Figure 6B:
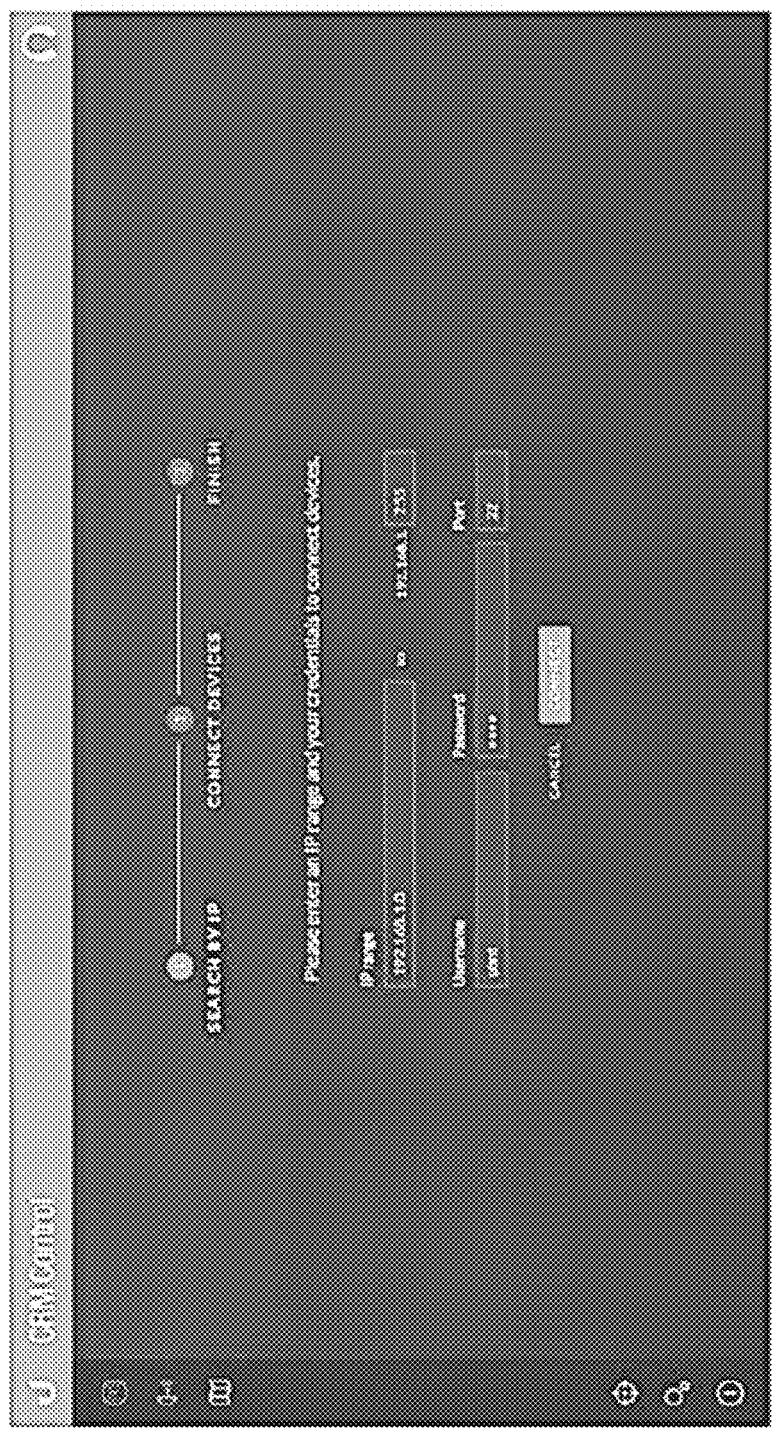
Figure 6C:
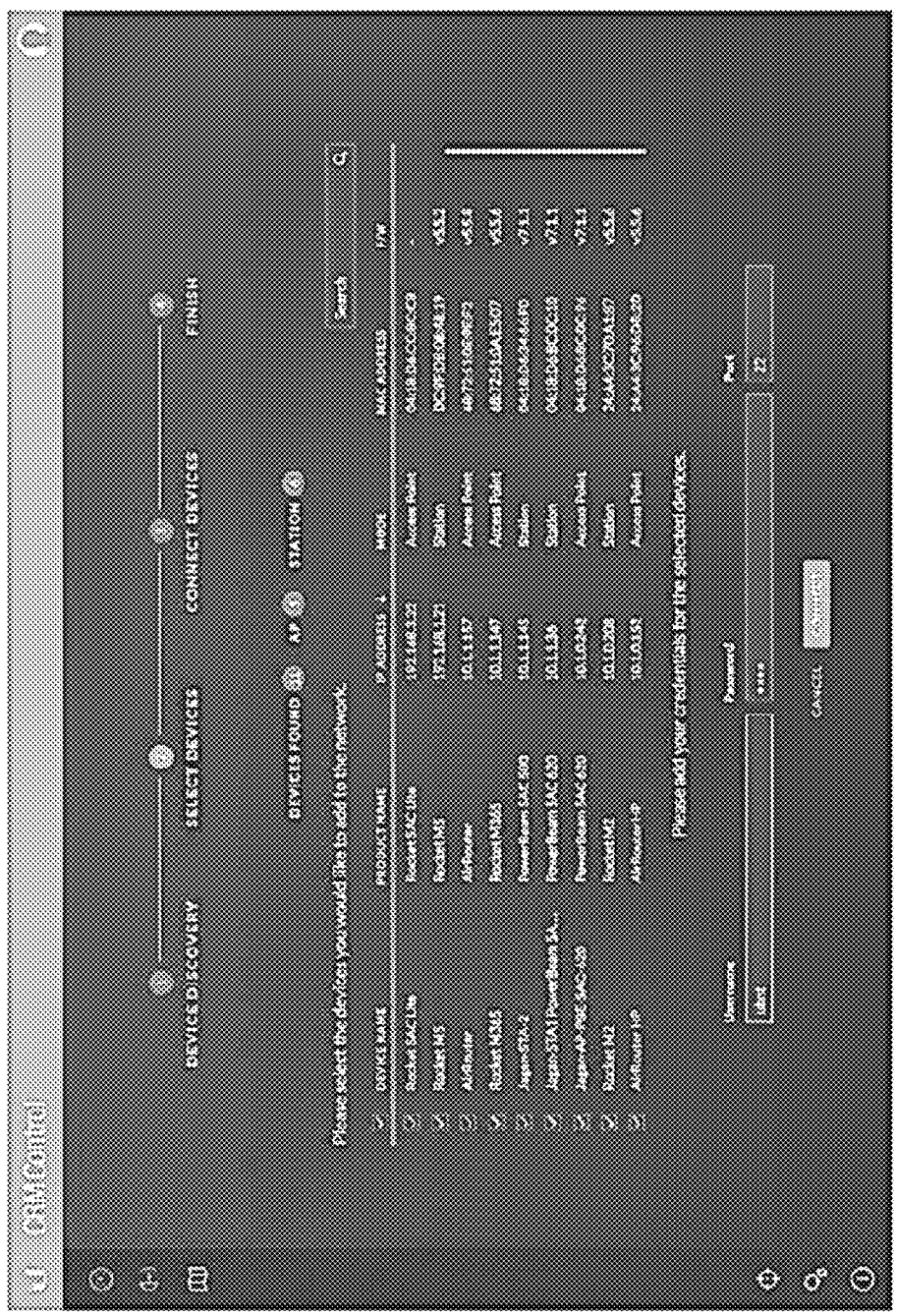

As shown in FIGS. 6A-6C the key may be paired and/or initialized with the user device (paired device). For example, a user may (at the IP address of the key) enter a name and password, and log into the key, as shown in FIGS. 6A-6B. FIG. 6C shows an example of a UI showing device connected to the key; additional devices may be discovered and added and/or accessed (through the key) by the paired device. For example, devices may be added to the key by IP address, or by discovering them (e.g., scanning for network devices). For example, in FIG. 2B the devices may be identified by scanning/searching through a range of IP addresses. Devices identified by the key may be connected with login credential to set up the key with network devices that it can/will be able to view/monitor/control. As mentioned, the key may also be configured to determine what information is added/pushed to the cloud (remote server), including opting out of such information (though in some variations a minimum amount of information may be transmitted even when opting out, such as devices present, and basic status of such devices, etc.). Devices may be managed "locally" by communicating directly between the paired device and the key.

In general, a network may be managed using a management system that typically requires a software based "controller" to be running on a computer for at least the initial setup of the computer. The controller software typically has to be running if you want to be able to view what devices are connected, cut off devices that are using too much data bandwidth, issue vouchers to get internet access, and many other features. Prior to the invention described herein, in most cases, a user had to run the controller software locally, on a Windows or Linux computer, or from a "cloud" based service that allowed the controller software to be set up on and accessible from anywhere.

The compact and integrated local key controller apparatuses described herein may provide an alternative intermediate solution. The compact and integrated local key controller apparatuses described herein are typically configured as tiny (very small footprint) computers that run the controller locally, e.g., at the switch and/or router. The user typically plus the compact and integrated local key controller apparatus into a port on a network switch and does not need to run a separate computer continuously as with previous controller software. The compact and integrated local key controller apparatus may contain its own operating system (e.g., Linux), controller logic (e.g., software, hardware and/or firmware), memory (e.g., an 8 GB Micro SD card or other removable and/or integrated memory), and is configured to have the ability for the controller to be remotely accessed initially from a remote server that only needs to handle a minimal amount of traffic (e.g., see FIGS. 8B and 9, above), while allowing direct peer-to-peer communication between the compact and integrated local key controller apparatus and a remote computer (which may be a laptop, desktop, pad and/or smartphone).

At installation of the apparatus, it may be provided with a static IP address, a user-defined IP address, or it may be assigned an IP address (e.g., a DHCP may assign an IP address). The compact and integrated local key controller apparatus may be configured as both an operating system and a network controller; multiple sets of login credentials may be used for each. The compact and integrated local key controller apparatus may be plugged into an open port on a switch on a network. The compact and integrated local key controller apparatus may use either a powered port (e.g., industry standard 48v POE) or a 5v USB type power supply, such as those used to charge portable devices like iPhones or Android tablets and a USB cord, e.g., having a Micro USB connector which may plug into the compact and integrated local key controller apparatus. In some variations, the default IP address of the compact and integrated local key controller apparatus is static; alternatively a DHCP server (e.g., router) may assign a different address. The IP address may then be used by a browser (e.g., on a 192.168.1.x. network), and may then connect to a user interface for initially setting up the compact and integrated local key controller apparatus.

The compact and integrated local key controller apparatus may be configured to set a permanent IP address and password, and optionally set the time zone. A static (fixed) IP address may be used by picking an address outside the scope of addresses being handed out to portable devices. Thereafter, from a browser the IP address of the compact and integrated local key controller apparatus may be used from a remote device to communicate (see, e.g., FIG. 9) and set up peer-to-peer communication between the apparatus and a local computer displaying data provided on the network, switch and/or client devices transmitted directly from the apparatus.

Any of the local key controller apparatuses described herein may be configured to provide a comprehensive overview of network health, including one or more indicators. In particular, the local key controller apparatuses described herein may provide a graphical network dashboard that includes indicators monitoring the network's vitals to allow an administrator to make adjustments as needed to improve performance of the network. A dashboard may provide a visual representation of the network's status and deliver basic information about each network segment. The local key controller apparatus may also provide detailed analytics. The analytics may be configured to allow monitoring of large user groups and expedite troubleshooting, including LAN/WLAN Groups.

For example, any of the local key controller apparatuses described herein may provide flexible configurations for large deployments, including creating multiple LAN and WLAN groups and assign them to the respective network devices.

The local key controller apparatuses described herein may also facilitate Wi-Fi Management, to allow a remote user to provision wireless access points (APs), configure wireless networks, map out networks, and manage system traffic. The local key controller apparatuses may provide radio frequency (RF) monitoring and device mapping for a network, detailed RF performance analysis for the network, band steering support for the network, and guest portal/hotspot support. The local key controller apparatuses described herein may also provide router and switch management, including provisioning of security gateways and switches, and configuring of: WAN/LAN/VLAN configuration, operation mode (switching, mirroring, or aggregate) per port, PoE setting per port, jumbo frame and flow control services, and/or monitor and analyze performance of each port of the switch.

As mentioned, the local key controller apparatus may also provide a Wi-Fi RF map to monitor wireless APs and analyze the surrounding RF environment. The local key controller apparatus may also or alternatively provide statistics on the operation of the network or component parts of the network. For example, the user interface displayed by a remote computer communicating with the local key controller apparatus may include a statistics tab that provides a visual representation of the network clients and network traffic carried by the switch (or switches) and networked APs.

EXAMPLE 1

Local Key Apparatus

A compact and integrated local key controller apparatus may be configured so that it (e.g., the controller software, hardware and/or firmware) may have a browser-based interface for easy configuration and management; this user interface may be displayed on a remote (or local) computer that the compact and integrated local key controller apparatus is in communication with. For example, in some variations, the compact and integrated local key controller apparatus is connected to a switch as described above, and accessed remotely. To access the user interface, a user may, for example: launch the controller application and log in to authenticate the user and remote (or local) computer to the compact and integrated local key controller apparatus. Upon validation and/or authentication of the user (or remote computer), the compact and integrated local key controller apparatus may securely and directly (peer-to-peer) communicate information to the remote computer and receive control instructions from the remote computer.

In some variations, the user interface for the compact and integrated local key controller apparatus may display information in a plurality of multiple screens or pages, which may be accessed via graphical navigation (e.g., a navigation bar or menu). For example, the apparatus may include controller software, hardware or firmware that provides six or more primary pages, such as "dashboard" (showing a summary or overview information on the network or component parts of the network), a map (graphically showing network information), a devices information region (providing information on wireless devices, such as access points, forming the network), a clients' information page (showing information on client devices using the network), a statistics portion (showing statistics on the network operation), and an insights portion (showing different kinds of status information).

The user interface may include common options that are accessible from anywhere in the interface, such as refresh (e.g., to update the on-screen information, and/or adjust the refresh interval). The user interface may also allow toggling between different networks, which are called sites. Each site may have its own configurations, maps, statistics, guest portals, and site administrator accounts. The multiple sites may be logically separated, and the initial site may be named "default." A sites overview may be displayed showing a list of available. Each site may be displayed with: a name (the name of the site), WAN connection status, LAN (wired network connection status), active displays (the number of active wired devices), inactive displays (the number of inactive wired devices), pending displays (the number of wired devices pending adoption), WLAN (the wireless network connection status), users displays (the number of wireless users S and wired users), guests displays (the number of wireless guests and wired guests), etc. Display formats (time/date, etc.) may also be selected.

New sites (new networks) may be created or added, so that a single remote computer may interface with multiple local key controller apparatuses simultaneously.

An events tab may be included to display a list of recent events, along with the corresponding device icon, device name, message, date, and time. A Properties panel may be displayed, and information about selected devices may appear as a popup within this panel. The information varies depending on the device type. Filters may be applied to filter recent events based on the time period specified (e.g., last hour, last 8 hours, last 24 hours, last 48 hours, 7 days, 2 weeks, or 30 days, etc.). One or more of the following filters may be applied: All (display all of the recent events), admin Only (display recent events for the administrator), LAN Only (display recent events for the wired network), WLAN Only (display recent events for the wireless networks), etc.

When there is a new alert, an icon displaying the number of new alerts may appear and an alerts tab may display a list of important events, along with the corresponding device icon, device name, message, date, and time.

Other configuration information for the displays and the apparatus may be set as well. For example, Site Configuration (site Name Change may set the name of the site), Country (select the appropriate country), Time Zone (Select the appropriate time zone), etc. An Automatic Upgrade field may be selected; when enabled, the apparatus controller will automatically upgrade the firmware when an update is available. The LED (indicator) on the apparatus may also be controlled; when enabled, the LEDs on the devices will light up. When disabled, the LEDs will turn off. An Alerts Select may allow the option to enable alert emails, which will be sent to the email addresses of the administrators. A speed test may be enabled, to run a periodic speed tests. In some variations, a DPI (Deep Packet Inspection) and/or Stateful Packet Inspection (SPI) may be used for traffic analysis. The DPI engine may track which applications (and IP addresses) are using the most bandwidth. A Port Remapping control may be used when the VOIP port to be remapped as a WAN2 port. And Uplink Connectivity Monitor control may monitors the uplinks of the managed APs, either wired or wireless, by checking to see if the gateway/custom IP can be reached. The monitor and wireless uplink capability may be enabled by default. A Default Gateway may be enabled by default so that all managed APs will use the gateway of the AP that is providing IP information, either by DHCP or Static designation.

Figure 10:
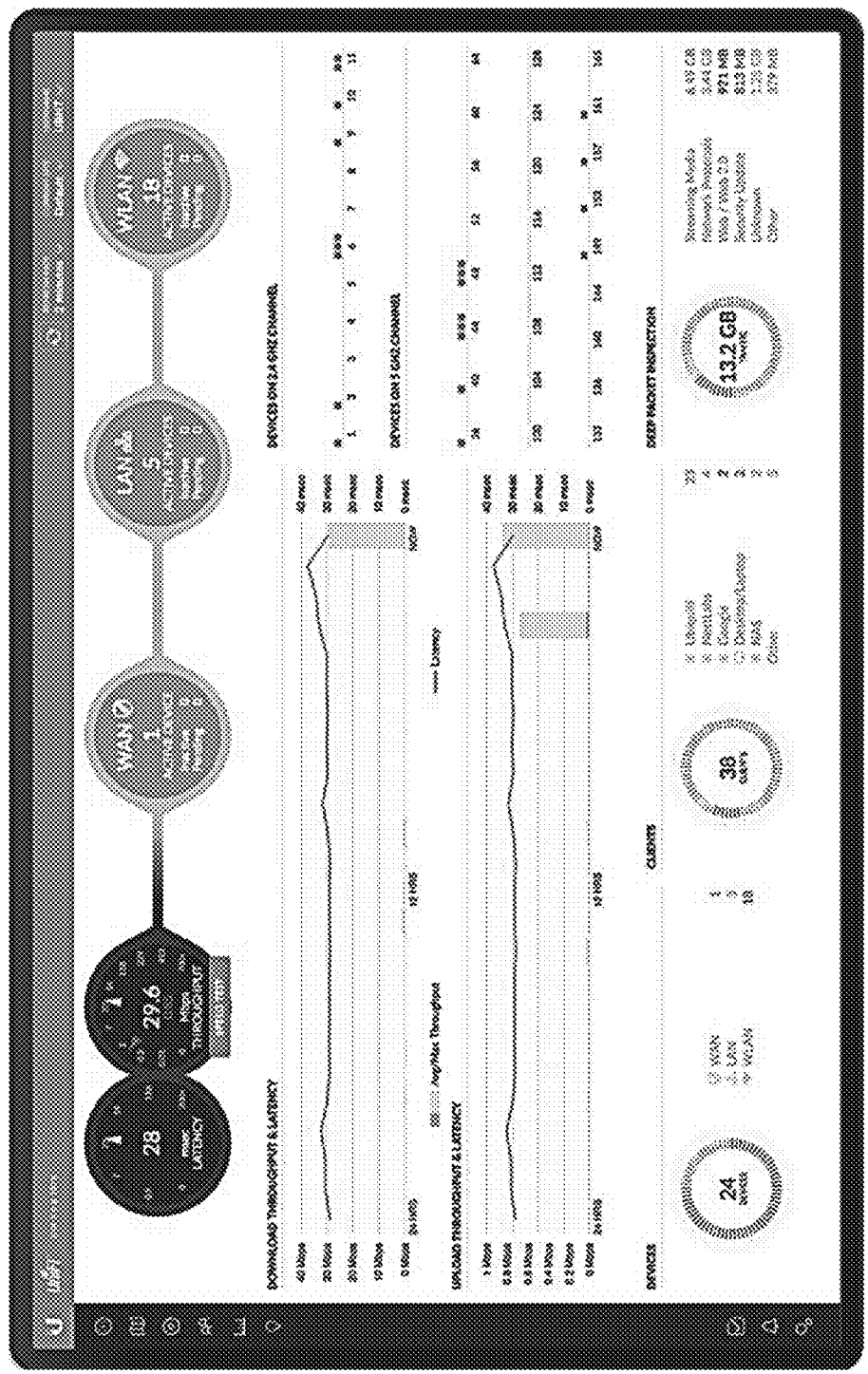
FIG. 10 illustrates one example of a "dashboard" user interface that may be provided by the local key controller apparatuses described herein to a remote computer/computing device (e.g., phone, laptop, pad, etc.).

A Dashboard screen may provide a visual representation of the network's status. FIG. 10 is an example of a Dashboard screen. Basic information may be provided for each node: Latency, Throughput, WAN, LAN, WLAN, etc. A latency value from the latest Speed Test may be displayed. The monitor may be color-coded to indicate status: e.g., Security Gateway is active, and the Speed Test is available (black); The Speed Test is not available because it requires an active Security Gateway (Red), etc. The throughput value from the latest Speed Test may be displayed. The monitor may be color-coded to indicate status: Security Gateway is active, and the Speed Test is available (black); the Speed Test is not available because it requires an active Security Gateway (red), etc.

Status information may be displayed, including current status information such as: Gateway (Displays the IP address of the service provider's gateway); DNS (Displays the IP addresses of the Domain Name System (DNS) servers); IP (Displays the Internet IP address of the Security Gateway); Uptime (Displays the length of time the Internet connection has been active); Latency (Displays the amount of time it takes a packet to travel from the Security Gateway to the service provider's gateway); Up (Displays the upload rate of your Internet connection); Down (Displays the download rate of your Internet connection), etc.

As mentioned, the results from the latest Speed Test may be displayed, including: Last Run (Displays the duration of time since the last Speed Test), Latency (Displays the amount of time it takes a packet to travel from the Security Gateway to the service provider's gateway); Up (Displays the upload speed); Down (Displays the download speed).

The WAN indicator may show (graphically) the basic details of the Security Gateway. For example, green may show that the WAN connection is active, Red that the WAN connection is inactive, etc., Active Devices (Displays the number of Gateway devices adopted and active); Inactive (Displays the number of Gateway devices adopted but not active); Pending (Displays the number of Gateway devices pending adoption); Status information may provide basic details of the wired network(s) are displayed. LAN IP may display the local IP address of the Security Gateway, clients (displays the total number of local clients); Up (Displays the upload rate of your Internet connection); Down (Displays the download rate of your Internet connection), etc.

The LAN display may show basic details of the wired networks, such as: the wired network is active (green); the wired network is inactive (red), Active Devices (Displays the number of wired devices adopted and active); Inactive (Displays the number of wired devices adopted but not active), Pending (Displays the number of wired devices pending adoption); Status information such as: Gateway (Displays the Internet IP address of the Security Gateway), Users (Displays the number of clients connected to the wired network); Guests (Displays the number of clients connected to the guest wired network); Switches (Displays the number of Switches managed on this site); Down (Displays the download rate of the wired network(s)); Up (Displays the upload rate of the wired network(s)), etc.

The WLAN display may provide basic details of the wireless network(s) such as: (Green) the wireless network is active; (Red) the wireless network is inactive, Active Devices (Displays the number of APs adopted and active); Inactive (Displays the number of APs adopted but not active); Pending (Displays the number of APs pending adoption); and Status information may display: Users (Displays the number of clients connected to the primary wireless network(s)); Guests (Displays the number of clients connected to the guest wireless network(s)); APs (Displays the number of APs managed on this site); Down (Displays the download rate of the wireless network(s)); Up (Displays the upload rate of the wireless network(s)), etc.

The controller may also provide information about the download throughput and latency, upload throughput and latency, Devices on a 2.4 GHz Channel (the 2.4 GHz Channel Occupancy Chart displays the channel use of the 2.4 GHz devices, showing each device displayed as a blue square in its channel); Devices on 5 GHz Channel, showing a 5 GHz Channel Occupancy Chart displays the channel use of the 5 GHz devices.

The apparatus user interface may also include information about devices (e.g., network devices), including traffic, number of gateway devices (WAN), number of wired devices (LAN), number of wireless devices (WLAN), etc. Client information may also be displayed (number of network clients, traffic, type, etc.).

As mentioned, packet inspection information may be provided (e.g., DPI) including the amount of traffic, the amount of traffic identified as streaming media, the amount of traffic identified as network protocol traffic, web-related traffic, security update traffic, etc.).

Figure 11:
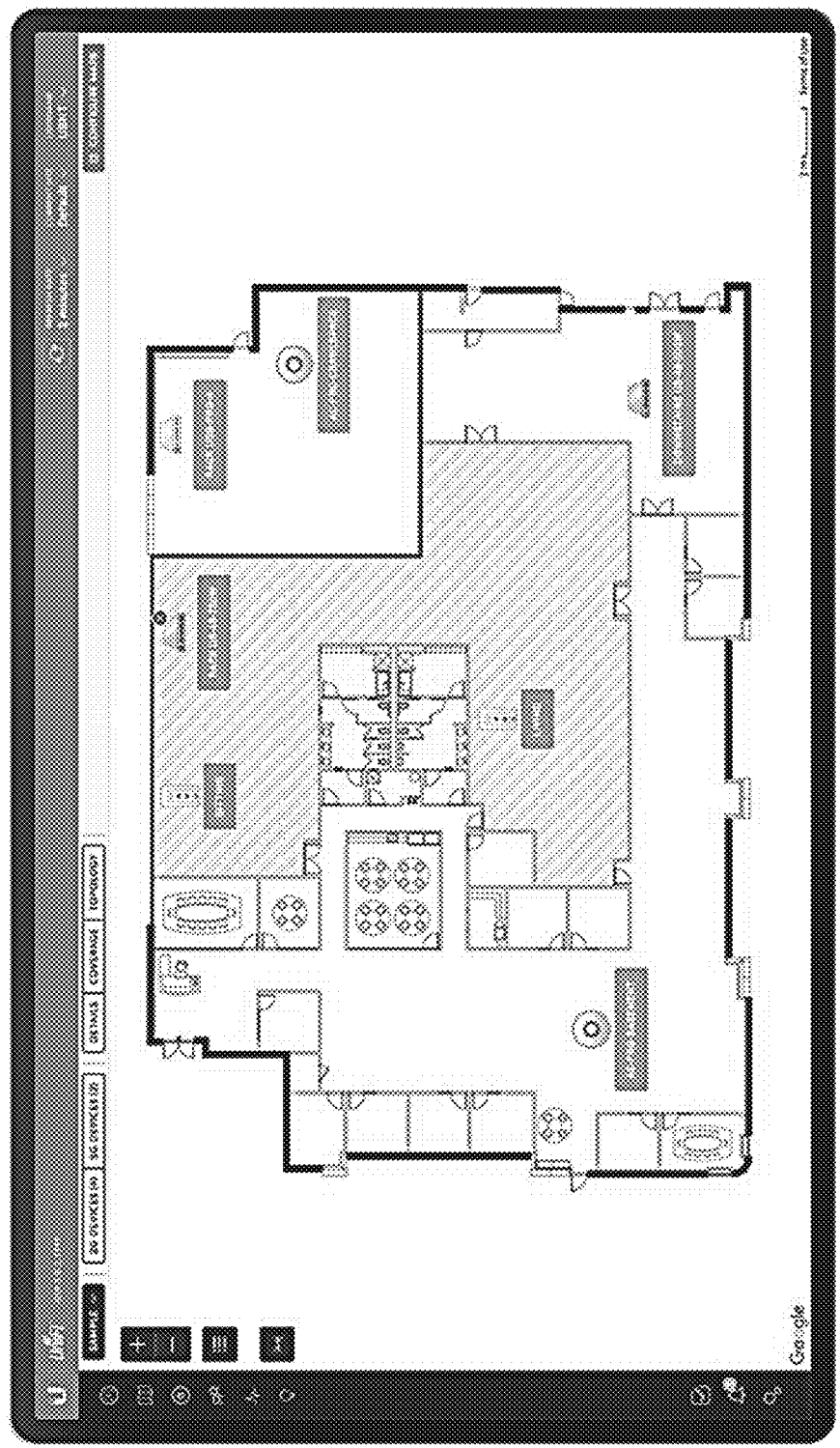
FIG. 11 is one example of a map that may be used as part of the user interface provide by the local key controller apparatuses described herein.

As mentioned, the Controller software of the Apparatuses described herein may allow a user to upload custom map images of location(s) or use maps (e.g., GOOGLE Maps) for a visual representation of a network. See, e.g., FIG. 11. When initially launching the Controller application on the remote computer, a default map may be displayed. Custom Maps may be added by uploading the image. Devices may then be placed on the map, and the status of the device shown on the map may be graphically indicated by color and/or icon. The map scale may be adjusted or adjustable.

Figure 12:
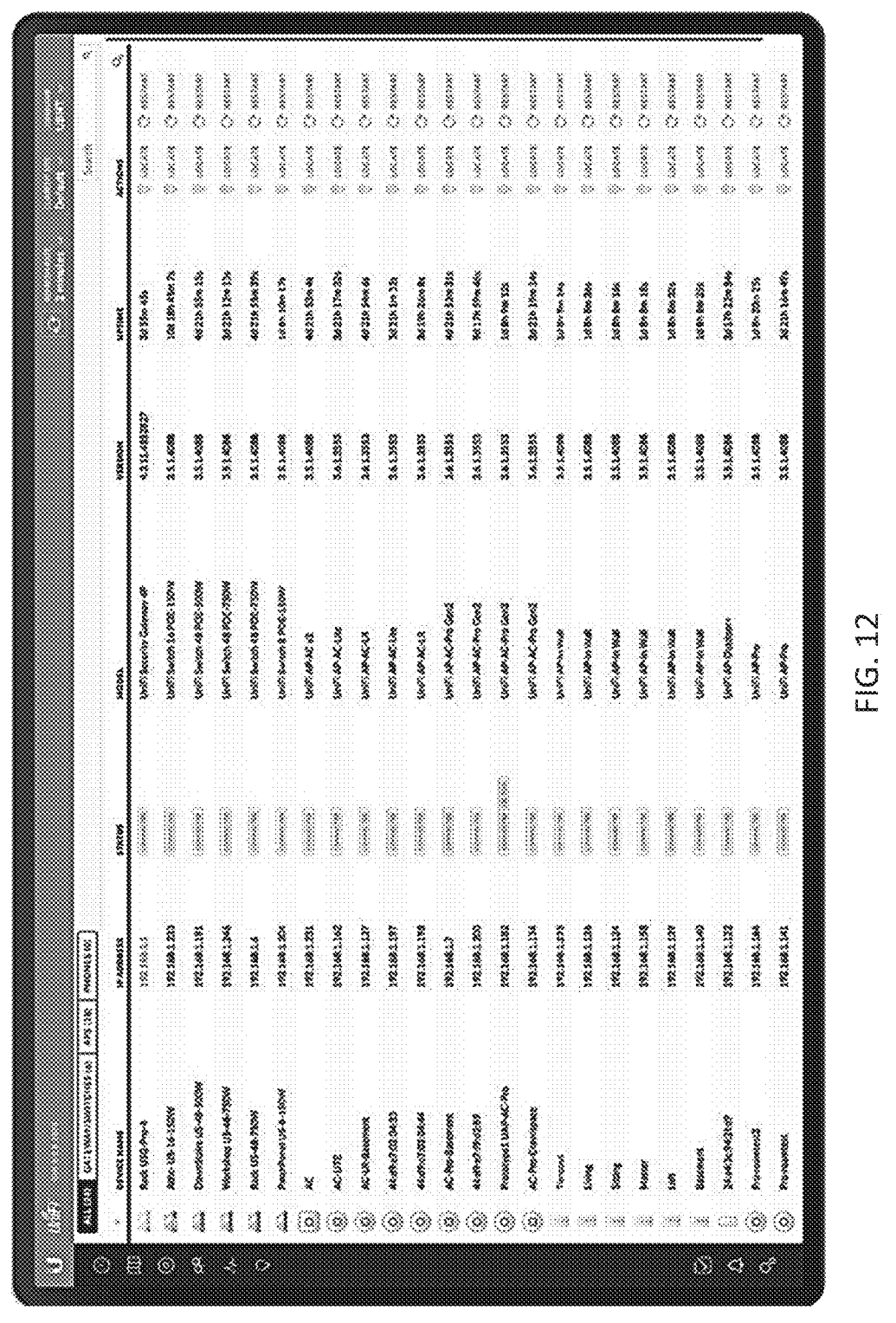

A Devices screen (see, e.g., FIG. 12) may display a list of devices discovered by the Controller. A used may select any of the column headers to change the list order, and may apply filters to view the display (e.g., all devices, Gateway/Switches, APs, VoIP Phones, etc.). Overview may display the number of clients, amount of data downloaded, amount of data uploaded, and channel setting, configuration may displays the WLAN and radio settings for the 2.4 GHz and 5 GHz radio bands, performance may displays the number of 2.4 GHz and 5 GHz clients, overall transmit rate, overall receive rate, transmit rates in the 2.4 GHz and 5 GHz radio bands, and channel setting.

The Device display may display Device Name, IP Address, Status, Model, Version, and Uptime columns; Gateway/Switches (Device Name, IP Address, Status, Model, Down, and Up columns are displayed); AP Overview (Device Name, IP Address, Status, Model, Clients, Down, Up, and Channel columns are displayed); AP Config (Device Name, Status, Version, WLAN2G, WLAN5G, Radio2G, and Radio5G columns are displayed); AP Performance (Device Name, IP Address, Status, 2G Clients, 5G Clients, TX, RX, TX 2G, TX 5G, and Channel columns are displayed); All columns (Device Name, MAC Address, IP Address, Status, Model, Version, Uptime, Clients, Down, WLAN2G, WLAN5G, Radio2G, Radio5G, 2G Clients, 5G Clients, TX, RX, TX 2G, TX 5G, and Channel columns are displayed); and/or All (all device types are displayed). Status may indicate connected, disconnected, pending approval, adopting, upgrading, managed by other, or isolated. A restart control may be included, allowing the user to select command information from the remote computer to the apparatus to restart the device. Other commands may include: locate (on the map, to ring a phone, etc.), upgrade (to upgrade firmware/software in the device); adopt (to adapt a device that appears with pending approval in its status), etc.

Figure 13:
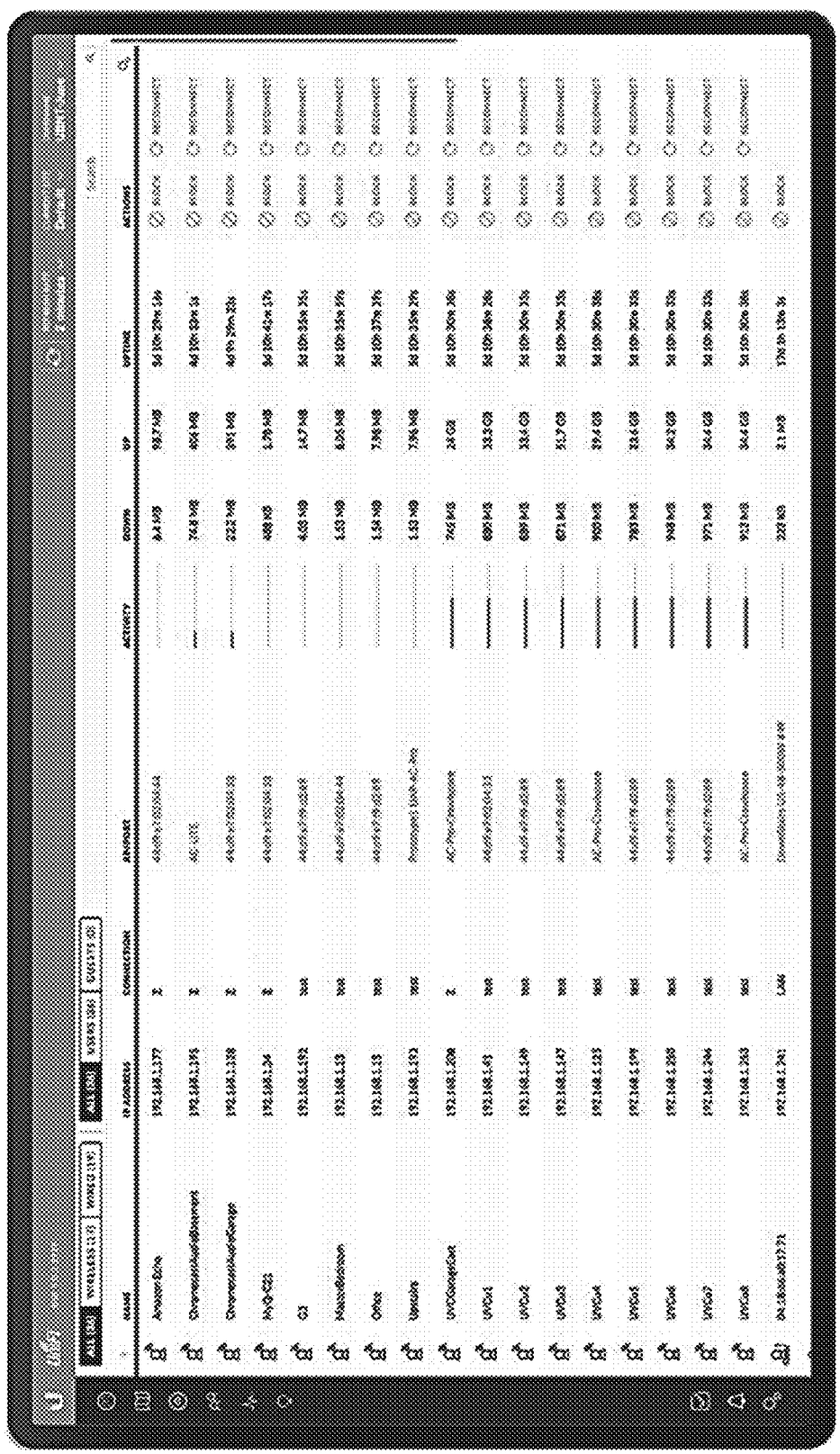
FIG. 13 illustrates an example of client information that may be provided by a local key controller apparatus to a remote computer/computing device as described herein.

A Clients screen (see, e.g., FIG. 13) may display a list of network clients. A user can click any of the column headers to change the list order. FIG. 13 illustrates one example of a clients screen. The user may apply s filter to this display. For example: All (Displays all clients, regardless of connection type); Wireless (Displays all wireless clients); Wired (Displays all wired clients). Secondary filters may be used. The data may be sorted or searched. Examples of the data provided include: Name (Displays the hostname, alias, or MAC address of the connected client. A user can click the name to get additional details); Hostname (Displays the hostname of the connected client); MAC Address (Displays the MAC address of the connected client); IP Address (Displays the IP address used by the client); 802.1x Identity (Displays the identity used for 802.1x authentication); 802.1x VLAN (Displays the VLAN or Virtual Local Area Network, used for 802.1x authentication); Status (Displays Authorized for all authorized guests or Pending for guests pending authorization); Network (Indicates which local network is used); AP/Port (For wireless clients, displays the name of the connected AP or port, and a user can click the name to get additional details; for wired clients, displays the name of the network device and port number used by the client, and a user can click the name to get additional details); Channel (Displays the channel used); PHY Mode (Displays the wireless standard and frequency band used by the signal, and may display an icon if the device uses power save mode, e.g., 11na (5 GHz), 11ac (5 GHz), 11ng (2.4 GHz), 11b (2.4 GHz), etc.); Signal (Displays the signal strength level and signal type); TX Rate (Displays the overall TX (transmit) rate); RX Rate (Displays the overall RX (receive) rate); Activity (Displays the relative level of activity for each client); Down (Displays the total amount of data downloaded by the client); Up (Displays the total amount of data uploaded by the client); Uptime (Displays the amount of time the client has been connected for this session), etc. In addition: IP Address Displays the IP address used by the client; Connection Indicates which local network is used. If the connection is wireless, then this displays the wireless network name or SSID; AP/Port Indicates which AP or switch port is used; Activity Displays the relative level of activity for each client; Down Displays the total amount of data downloaded by the client; Up Displays the total amount of data uploaded by the client; Uptime Displays the amount of time the client has been connected for this session.

In addition, the remote computer may be used to select one or more commands to modify the network based on this information, such as, for example: BLOCK to block this client from accessing the network. (Click UNBLOCK to unblock this client), Reconnect (Click RECONNECT to reconnect a wireless client; a user can click RECONNECT to kick out a client, which usually reconnects back quickly; this is useful for troubleshooting or resolving a problematic wireless connection); Unauthorize/Authorize (Available for Guests) (Click AUTHORIZE to remove authorization of guest access and disconnect the guest, or click ©AUTHORIZE for guests pending authorization), etc.

Figure 14:
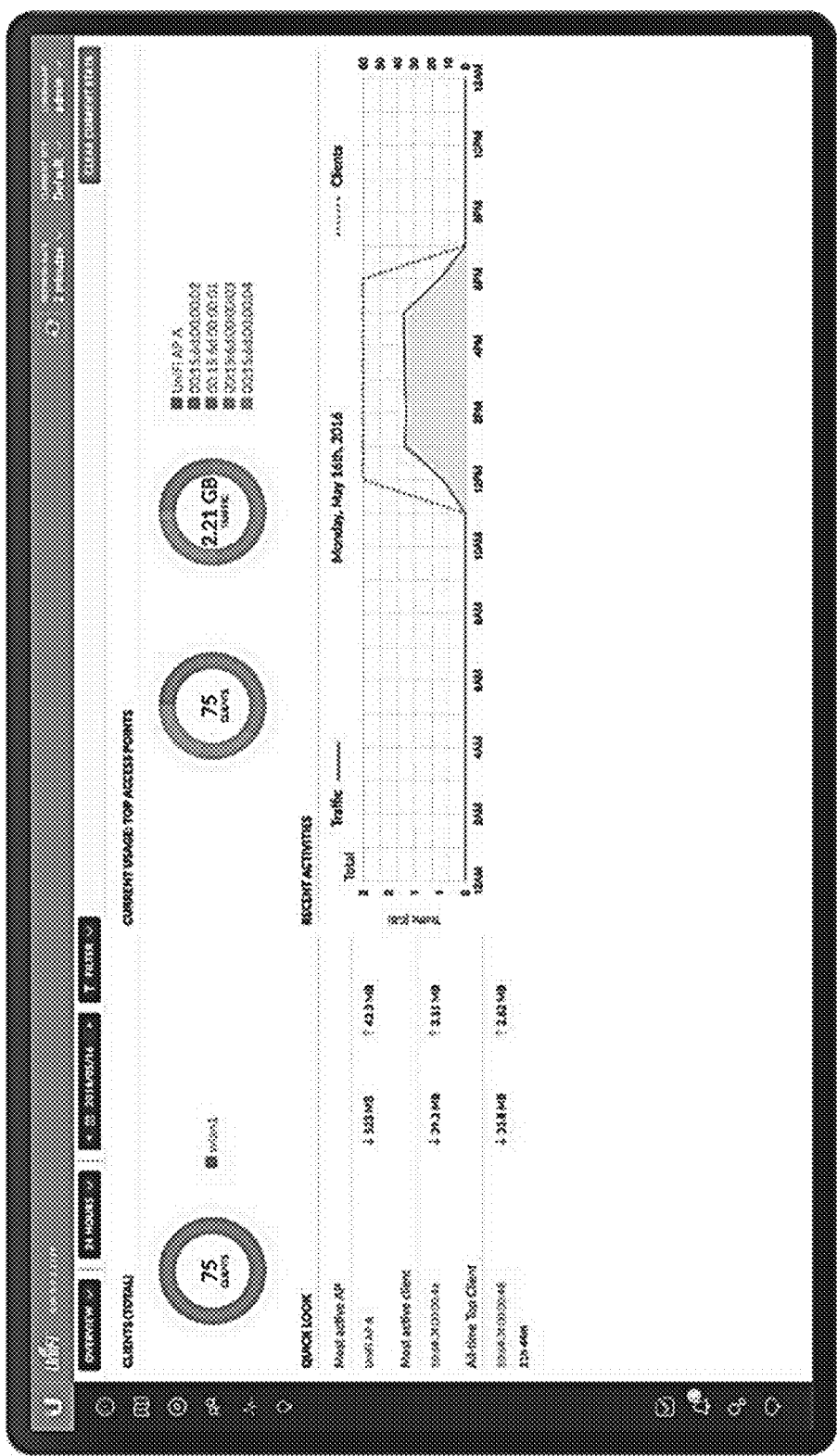
FIG. 14 is an example of a statistic screen of a user interface based on information provided by a local key controller apparatus to a remote computer/computing device.
Figure 15:
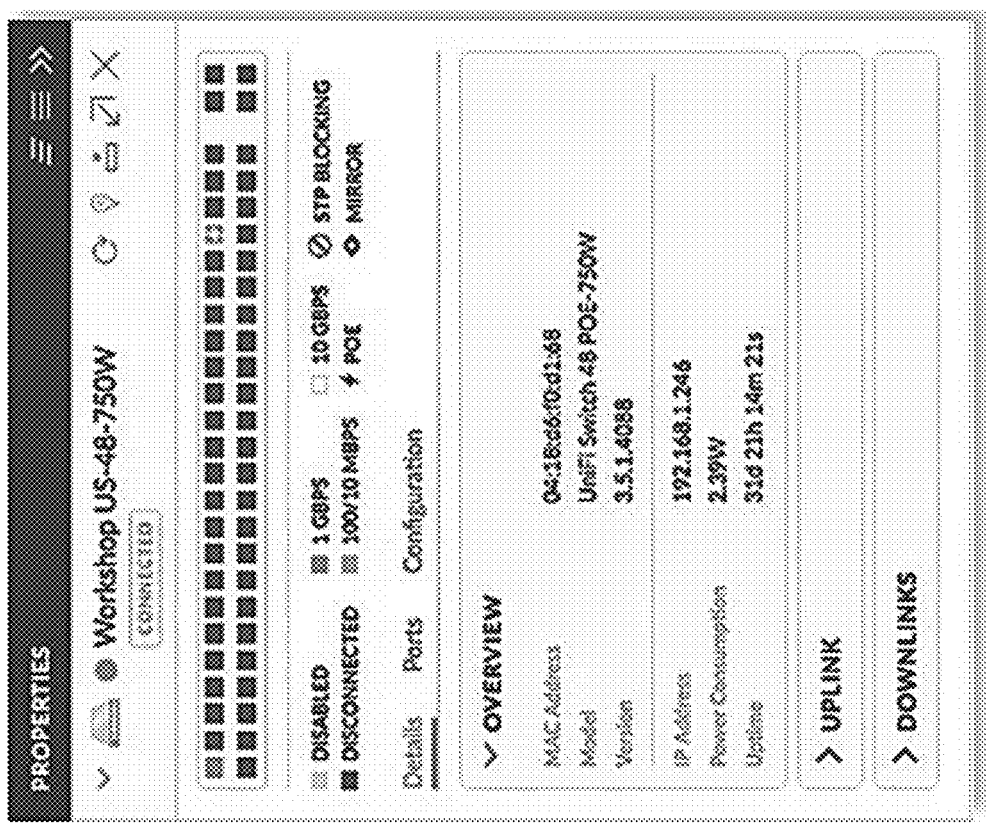
FIG. 15 is an example of switch details screen or panel of a user interface based on information provided by a local key controller apparatus to a remote computer/computing device.

A Statistics screen may provide a visual representation of the clients and network traffic connected to the managed network, as provided to the remote computer from the local key controller apparatuses described herein. FIG. 14 illustrates one example of a statistics screen as described herein. Two views may be used: Overview (default view describes the wireless clients and network traffic) and Traffic Stats (describes the network traffic by application usage).

Multiple graphs may be selected to display various information, including the number of client (total), a quick look, a view of the most active AP(s) (e.g., name and/or MAC address, total amount of data downloaded and/or uploaded), most active client(s) (e.g., name and/or MAC address, total amount of data downloaded and/or uploaded), all-time top client ((e.g., name and/or MAC address, total amount of data downloaded and/or uploaded), current use: top access points (number of clients, traffic, etc.) recent activities, traffic statistics, overall traffic, etc.

A Switch display (e.g., hyperlink) may be opened as part of a Switch's Details window either in a Properties panel or as a separate popup window. The Properties panel may show information about each selected device as a popup within this panel. The panel or screen may include: Display (Clicks to display the device information); icon (Displays the icon of the device; the icon may vary depending on the model); status (Displays to indicate the device status, e.g., Pending Approval, available for adoption, Connected, Managed by Other, e.g., not controlled by the current Controller, Disconnected, etc.). The panel may also include Name/MAC Address (Displays the device name or MAC address of the device); a Restart control (to restart the selected device); a Locate control (to flash the LED on the device and the device icon on the Map tab so the user can locate it; the LED may flash until the Locate button is clicked again); Upgrade control (Click to upgrade the device), etc.

An Overview display may be used to display the device specifics, connection details, and uptime. For example, for Uplink: MAC address (Displays the name or MAC address of the uplink device; a user can click the name to get additional details); Speed (Displays the connection speed in Mbps); Duplex (Displays the mode, Full Duplex or Half Duplex); Down Pkts/Bytes (Displays the amount of data downloaded as packets and bytes); Up Pkts/Bytes (Displays the number of packets and total bytes uploaded by the device); Activity (Displays the level of activity in Bytes per second), etc.

In general, the overview may display any of: MAC Address (Displays the MAC address or unique hardware identifier of the Switch); Model (Displays the model name of the Switch); Version (Displays the version number of the Switch's firmware); IP Address (Displays the IP address of the Switch); Power Consumption (Displays the amount of power used by the Switch); Temperature (Displays the general temperature of the Switch); Fan Level (If the Switch has a fan, then the Fan Level, from 0 to 3, is displayed; If the Switch does not have a fan, then the Fan Level is not displayed); Uptime (Displays the duration of time the Switch has been running without interruption).

The user interface may also be configured to display one or more ports (e.g., the user may show and control ports of the switch. For example, FIG. 16 shows an example of a display that may be displayed on a remote computer based on information provided from the apparatus; the user may select inputs from this screen or related screens to modify activity of the network, including the network switch. For example, a user interface may display one or more of: Port (Displays the number of the connected port); Device (Displays the name or MAC address of the downlink device. You can click the name to get additional details); Model (Displays the model number of the downlink device); Status (Displays the connection speed and duplex mode).

For example, the user may display and control the ports of the switch, e.g., by selecting a Ports display to display the port name, status, TX and RX throughput, PoE setting, and networks/VLANs.

The user may click a button to perform a desired action, such as: Edit (Click to change the port configuration), Powercycle (Click to restart the connected device), etc. Port Configuration may be displayed and modified by a user to switch, mirror, or aggregate one or more ports.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims. The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A compact and integrated local key controller apparatus for remotely managing a network of wireless devices connected to a computer network switch, the apparatus comprising:
    a housing;
    an Ethernet connection configured to connect to the computer network switch connected to a plurality of network devices including a plurality of wireless access points behind a firewall;
    a processor within the housing, the processor configured to:
        identify the local key controller apparatus to a remote server;
        authenticate a request from a remote computer outside of the firewall to communicate with the local key controller apparatus;
        communicate a controller information directly with the remote computer without passing the controller information through the remote server, wherein the controller information comprises monitoring information about the network devices and computer network switch information;
        receive a modification information from the remote computer without passing the modification information through the remote server; and
        modify the computer network switch, the network devices, or both the computer network switch and network devices based on the modification information.

2. The apparatus of claim 1, wherein the housing encloses a volume that is less than 0.2 cm$^3$ and wherein the apparatus weighs less than 150 g.

3. The apparatus of claim 1, further comprising a single button on the housing configured as a reset button.

4. The apparatus of claim 1, further comprising a memory card slot configured to hold a removable memory.

5. The apparatus of claim 1, further comprising an indicator light visible on the housing.

6. The apparatus of claim 1, wherein the Ethernet connection comprises a power of Ethernet (PoE) connection.

7. The apparatus of claim 1, wherein the processor is configured to identify the local key controller apparatus to the remote server upon connecting the apparatus to the computer network switch.

8. The apparatus of claim 1, wherein the processor is configured to communicate controller information wherein the controller information comprises one or more of: monitoring information about the network devices including one or more of: network device name, IP address, connectivity status (number of connections, etc.), activity, down/up time; latency of the network; network throughput; radio frequency (RF) channel information; computer network switch information including one or more of: port name, status, transmitting/receiving (Tx/Rx), PoE capability; RF performance analysis; and RF monitoring and device mapping.

9. The apparatus of claim 1, wherein the processor is configured to modify the computer network switch, the network devices, or both the computer network switch and network devices based on the modification information and the modification information comprises one or more of: network device configuration information, LAN and WLAN group assignments for the network devices, provisioning of the network devices, radio frequency (RF) band steering, WAN/LAN/VLAN configuration of the computer network switch, and operation mode configuration for one or more ports on the switch.

10. A compact and integrated local key controller apparatus for remotely managing a network of wireless devices connected to a computer network switch, the apparatus comprising:
  a housing;
  a power over Ethernet connection configured to connect to the computer network switch connected to a plurality of network devices including a plurality of wireless access points behind a firewall;
  a processor within the housing, the processor configured to:
    identify the local key controller apparatus to a remote server when the apparatus is connected to the computer network switch;
    authenticate a request from a remote computer outside of the firewall to communicate with the local key controller apparatus;
    communicate controller information directly between with the remote computer without passing the controller information through the remote server, wherein the controller information comprises one or more of:
      monitoring information about the network devices including one or more of: network device name, IP address, connectivity status (number of connections, etc.), activity, down/up time;
      latency of the network;
      network throughput;
      radio frequency (RF) channel information;
      computer network switch information including one or more of:
        port name, status, transmitting/receiving (Tx/Rx), PoE capability;
      RF performance analysis; and
      RF monitoring and device mapping;
    receive a modification information from the remote computer without passing the modification information through the remote server; and
    modify the computer network switch, the network devices, or both the computer network switch and network devices based on the modification information, wherein the modification information comprises one or more of:
      network device configuration information,
      LAN and WLAN group assignments for the network devices,
      provisioning of the network devices,
      RF band steering,
      WAN/LAN/VLAN configuration of the computer network switch, and
      operation mode configuration for one or more ports on the switch.

11. The apparatus of claim 10, wherein the housing encloses a volume that is less than 0.2 cm$^3$ and wherein the apparatus weighs less than 150 g.

12. The apparatus of claim 10, further comprising a single button on the housing configured as a reset button.

13. The apparatus of claim 10, further comprising a memory card slot configured to hold a removable memory.

14. The apparatus of claim 10, further comprising an indicator light visible on the housing.

15. A method of remotely controlling a network using a compact and integrated local key controller apparatus, the method comprising:
  connecting the local key controller apparatus to a port of a computer network switch behind a firewall, wherein the computer network switch is connected or configured to connect to a plurality of network devices including a plurality of wireless access points;
  identifying the local key controller apparatus to a remote server;
  receiving a request from a remote computer outside of the firewall to communicate with the local key controller apparatus;
  authenticating the request;
  communicating controller information directly between the local key controller apparatus and the remote computer without passing the controller information through the remote server, wherein the controller information comprises monitoring information about the network devices and computer network switch information;
  communicating modification information from the remote computer to the local key controller apparatus without passing the modification information through the remote server; and
  modifying the computer network switch, the network devices, or both the computer network switch and network devices based on the modification information.

16. The method of claim 15, wherein communicating controller information comprises displaying a graphical user interface displaying the controller information on the remote computer.

17. The method of claim 15, wherein the local key controller apparatus identifies itself to the remote server upon connection to the computer network switch.

18. The method of claim 15, wherein receiving the request from the remote computer comprises receiving the request in the remote server.

19. The method of claim 15, wherein authenticating the request comprises providing a secure and private single sign-on.

20. The method of claim 15, wherein communicating controller information comprises communicating monitoring information about the network devices including one or more of: network device name, IP address, connectivity status (number of connections, etc.), activity, down/up time.

21. The method of claim 15, wherein communicating controller information comprises communicating one or more of: latency of the network; network throughput; radio frequency (RF) channel information; computer network switch information including one or more of: port name, status, transmitting/receiving (Tx/Rx), PoE capability; RF performance analysis; and RF monitoring and device mapping.

22. The method of claim 15, wherein modifying the computer network switch, the network devices, or both the computer network switch and network devices comprises modifying based on the modification information comprising one or more of: network device configuration information; LAN and WLAN group assignments for the network devices; provisioning of the network devices; radio frequency (RF) band steering, WAN/LAN/VLAN configuration of the computer network switch, and operation mode configuration for one or more ports on the computer network switch.

23. A method of remotely controlling a network using a compact and integrated local key controller apparatus, the method comprising:
- connecting the local key controller apparatus to a port of a computer network switch behind a firewall, wherein the computer network switch is connected or configured to connect to a plurality of network devices including a plurality of wireless access points;
- identifying the local key controller apparatus to a remote server, wherein the local key controller apparatus identifies itself to the remote server upon connection to the computer network switch;
- receiving a request from a remote computer outside of the firewall to communicate with the local key controller apparatus in the remote server;
- authenticating the request;
- communicating controller information directly between the local key controller apparatus and the remote computer without passing the controller information through the remote server, wherein the controller information comprises one or more of:
  - monitoring information about the network devices including one or more of: network device name, IP address, connectivity status (number of connections, etc.), activity, down/up time;
  - latency of the network;
  - network throughput;
  - radio frequency (RF) channel information;
  - computer network switch information including one or more of: port name, status, transmitting/receiving (Tx/Rx), PoE capability;
  - RF performance analysis; and
  - RF monitoring and device mapping;
- communicating modification information from the remote computer to the local key controller apparatus without passing the modification information through the remote server; and
- modifying the computer network switch, the network devices, or both the computer network switch and network devices based on the modification information, wherein the modification information comprises one or more of:
  - network device configuration information,
  - LAN and WLAN group assignments for the network devices,
  - provisioning of the network devices,
  - RF band steering,
  - WAN/LAN/VLAN configuration of the computer network switch, and
  - operation mode configuration for one or more ports on the switch.

24. The method of claim 23, wherein communicating controller information comprises displaying a graphical user interface displaying the controller information on the remote computer.

25. The method of claim 23, wherein authenticating the request comprises providing a secure and private single sign-on.

* * * * *